United States Patent
Inoue

(10) Patent No.: US 7,852,529 B2
(45) Date of Patent: Dec. 14, 2010

(54) IMAGE PROCESSING APPARATUS, IMAGE PRINTER, AND METHOD OF IMAGE PROCESSING PERFORMED BY THE IMAGE PROCESSING APPARATUS

(75) Inventor: Yutaka Inoue, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1225 days.

(21) Appl. No.: 11/371,220

(22) Filed: Mar. 9, 2006

(65) Prior Publication Data

US 2006/0221369 A1    Oct. 5, 2006

(30) Foreign Application Priority Data

Mar. 14, 2005    (JP)    ............... 2005-070333

(51) Int. Cl.
*H04N 1/46*    (2006.01)

(52) U.S. Cl. ..................................... 358/501

(58) Field of Classification Search ........... 358/1.2–1.9, 358/501–503
See application file for complete search history.

(56) References Cited

U.S. PATENT DOCUMENTS

| 6,820,962 | B2 * | 11/2004 | Uchida ........................ 347/36 |
| 6,834,929 | B1 * | 12/2004 | Adams et al. .................. 347/19 |
| 2003/0063152 | A1 * | 4/2003 | Edamura et al. .............. 347/36 |
| 2003/0179928 | A1 * | 9/2003 | Kusama et al. .............. 382/180 |
| 2005/0099644 | A1 * | 5/2005 | Nomoto et al. ............ 358/1.12 |
| 2006/0103667 | A1 * | 5/2006 | Amit et al. ................... 345/619 |

FOREIGN PATENT DOCUMENTS

| JP | 2002-244826 | 8/2002 |
| JP | 2003-108993 | 4/2003 |
| JP | 2003-216367 | 7/2003 |
| JP | 2004-082528 | 3/2004 |
| JP | 2004-208334 | 7/2004 |
| JP | 2004-297781 | 10/2004 |
| JP | 2004-326659 | 11/2004 |
| JP | 2004-357133 | 12/2004 |

* cited by examiner

*Primary Examiner*—Anand Bhatnagar
*Assistant Examiner*—Alex Liew
(74) *Attorney, Agent, or Firm*—Rabin & Berdo, P.C.

(57) ABSTRACT

An image processing apparatus includes a print region storing section, image data producing section, image region detecting section, comparing section, deciding section, and image data processing section. The image data producing section stores a print region of a medium. The image data producing section produces image data. The image region detecting section detects an image region of the image data. The comparing section compares the print region with the image region, and outputs a comparison result. The deciding section determines based on the comparison result whether the image data should be printed in a borderless printing mode. The image data processing section processes the image data such that the image data is ready to print, the image data being processed when the comparison result indicates that the image data should be printed in the borderless printing mode.

18 Claims, 18 Drawing Sheets

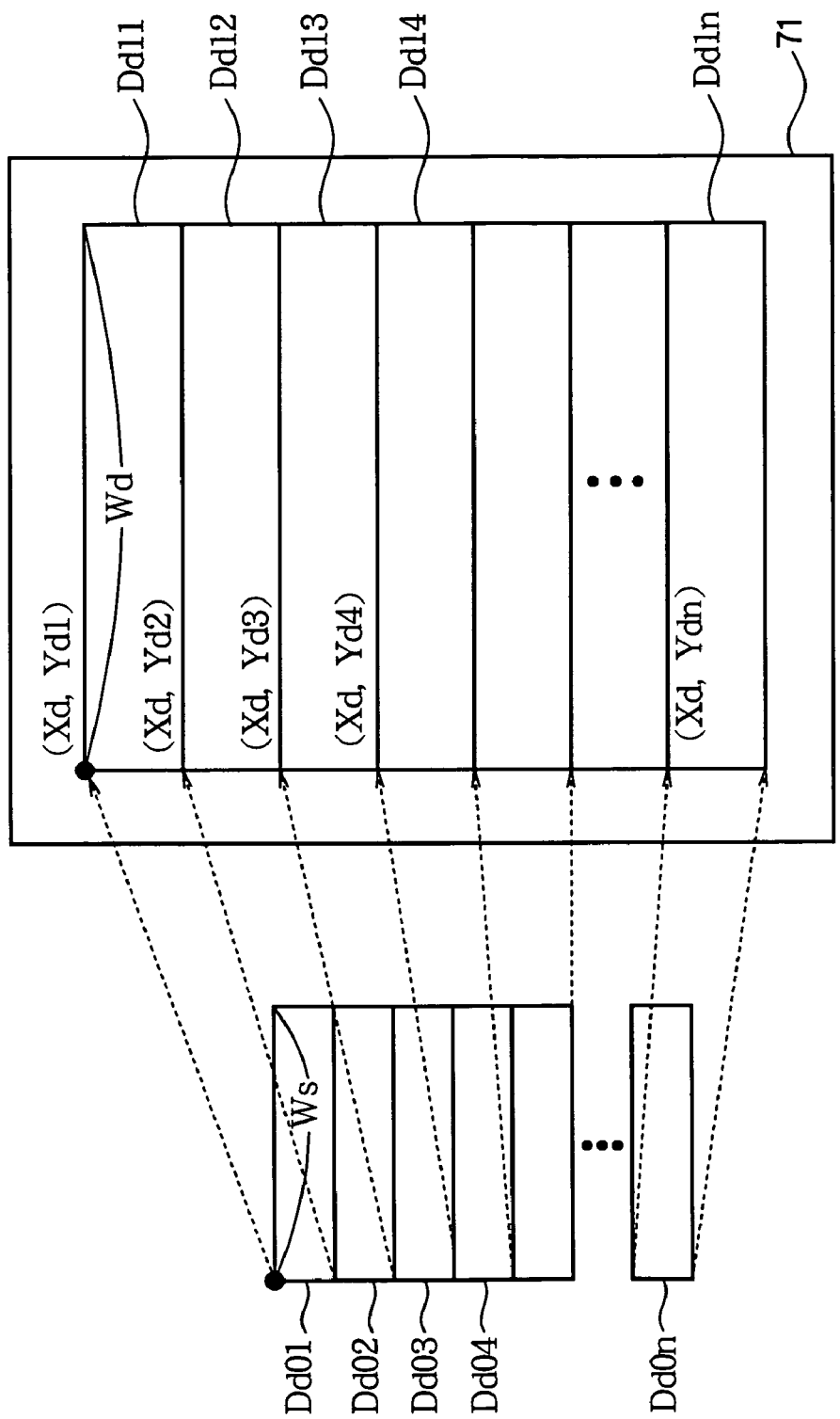

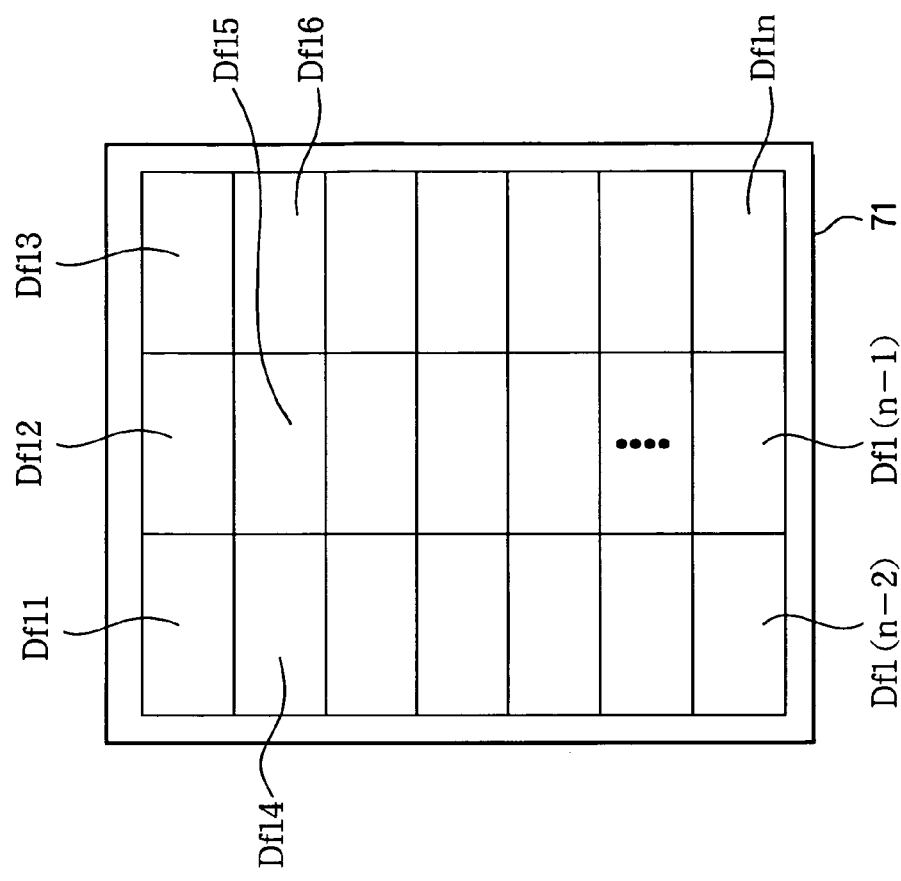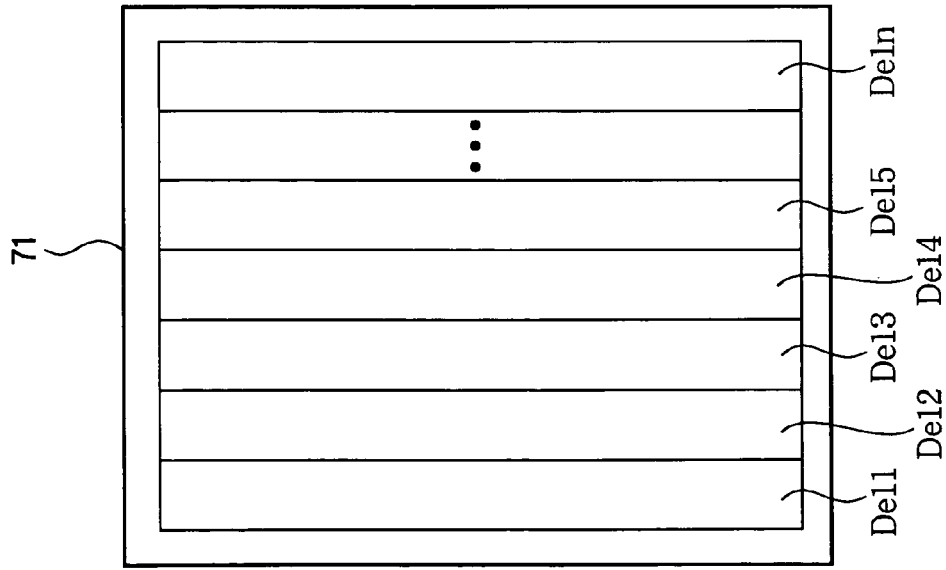

IMAGE PROCESSING APPARATUS, IMAGE PRINTER, AND METHOD OF IMAGE PROCESSING PERFORMED BY THE IMAGE PROCESSING APPARATUS

BACKGROUND OF THE INVENTION

1. Field of the Invention

The present invention relates to an image processing apparatus that includes a printer section that prints an image on a recording medium such as paper, and a computer section that controls the printer section and produces an image data to be printed together with controls. The present invention particularly relates to an image processing apparatus capable of printing image data on a recording medium without borders.

2. Description of the Related Art

A conventional image processing apparatus is capable of producing a borderless print. A user selects a size of the recording medium and a borderless printing mode through a selection menus screen of a printer driver of a computer. Once the size of the recording medium and the borderless printing mode are selected, an application program produces an image data that fits to an image region of the paper. Then, the image data is expanded into a size larger than the paper size. The expanded image data is then outputted together with a print command that specifies "borderless printing." The printer prints the expanded image on the paper, thereby performing the borderless printing.

For example, Japanese Patent (KOKAI) Publication No. 2002-244826 discloses a printing method in which image data for a page contains as small an amount of characters as can fill a predetermined number of lines, the image data for that page is added to the end of the immediately preceding page. Then the overall size of the preceding page is compressed into the normal size, and the image data for that page is sent to a printer.

However, for example, when a user wishes to perform borderless printing every time an image is printed, it is inconvenient for the user to select the borderless printing mode for each page of the image on the selection menu of a printer driver. Accordingly, a need exists in the art for an apparatus capable of performing borderless printing automatically if the image data has only a small margin and the user wishes to print the image data in a borderless printing mode.

A conventional image forming apparatus is not capable of determining whether image data produced with an application program has a print margin such that the image data can be printed in the borderless printing mode. Even if the image forming apparatus is capable of determining whether image data has a print margin such that the image data can be printed in a borderless printing mode, the image data may not have the same aspect ratio as the paper on which the image data is printed. Such a situation cannot be avoided. Because it cannot be determined from the image data as to whether borderless printing is possible, the user has to select borderless printing on the printer driver.

SUMMARY OF THE INVENTION

The present invention was made in view of the aforementioned drawbacks of the conventional art.

An object of the invention is to provide an image forming apparatus capable of automatically determining whether borderless printing of image data is possible before performing the borderless printing.

Another object of the invention is to provide an image forming apparatus capable of performing the borderless printing of the image data such that the center of the image is on the center of the print paper.

An image processing apparatus includes a print region storing section, image data producing section, image region detecting section, comparing section, deciding section, and image data processing section. The image data producing section stores a print region of a medium. The image data producing section produces image data. The image region detecting section detects an image region of the image data. The comparing section compares the print region with the image region, and outputs a comparison result. The deciding section determines based on the comparison result whether the image data should be printed in a borderless printing mode. The image data processing section processes the image data such that the image data is ready to print, the image data being processed when the comparison result indicates that the image data should be printed in the borderless printing mode.

The image data processing section sends the image data together with an item of information to a printer, the item of information specifying that the image data should be printed in the borderless printing mode.

The image processing apparatus further includes a borderless printing specifying section that outputs a command to expand the image data to a size larger than the print region of the medium and print the expanded image data; and a transmitter that transmits the command to a printer.

The print mode specifying section produces a command to feed the medium at a timing such that an image region of the expanded image data in excess of the print region of the medium is not printed.

One complete image includes a plurality of items of image data and the deciding section determines whether each item of image data contains an image region that can be printed in the borderless printing mode.

The image processing section that further includes a display section and a preview outputting section. The display section displays the second image region. The preview outputting section causes the display section to display a preview of an image region of the expanded image data before the expanded image data is printed.

The image processing apparatus further includes a deciding section that prompts a user to select a manual selection mode where the user determines that printing should be performed in the borderless printing mode or an automatic mode where the deciding section automatically determines based on the comparison result whether printing should be performed in the borderless printing mode.

The image size expanding section converts an item of image data having a first image region into expanded image data having a second image region, the item of image data being one that can be printed in the borderless printing mode.

The image processing section further includes an operation/input section and a preview-display selecting section. A user inputs a command through the operation/input section. The preview-display selecting section allows the user to select through the operation/input section as to whether the preview should be displayed on the display section.

The image processing apparatus further includes an image processing section that includes an image size expanding section and a print mode specifying section. The image size expanding section converts the image data having a first image region into an expanded image data having a second image region when the comparison result indicates that the image data should be printed in the borderless printing mode. The second image region is larger than the print region by a positional error of the second image region relative to the print region. The print mode specifying section produces a command to feed the medium such that the expanded image data is printed on the medium in position.

If the image data has an image region smaller than the print region of the medium, the deciding section determines that the image data has an image region that can be printed in the borderless printing mode.

When the image region is placed over the print region of the medium, if the print region has a margin that does not overlap the image region and that is smaller than an area, the deciding section determines that the image data should be printed in the borderless printing mode.

The image processing apparatus is a printer. The image data processing section expands the image data, and then prints the expanded image data on the medium.

A method for processing an image, comprising the steps of:
storing a print region of a medium;
producing image data;
detecting an image region of the image data;
comparing the print region with the image region and then outputting a comparison result;
determining based on the comparison result whether the image data should be printed in a borderless printing mode; and
processing the image data such that the image data is ready to print, the image data being processed when the comparison result indicates that the image data should be printed in the borderless printing mode.

When the image region is smaller than the print region, it is determined that the image data should be printed in a borderless printing mode.

When the image region is placed over the print region of the medium, if the print region has a margin that does not overlap the image region and that is smaller than an area, then it is determined that the image data should be printed in a borderless printing mode.

The method further includes a step of producing a command to feed the medium at a timing such that an image region of the expanded image data in excess of a leading end of the print region of the medium is not printed.

The step of determining includes a step of prompting a user to select a manual selection mode where the user determines whether printing should be performed in the borderless printing mode or an automatic mode where the deciding section automatically determines whether printing should be performed in the borderless printing mode.

When one complete image includes a plurality of items of image data, it is determined whether each item of image data contains an image region that can be printed in the borderless printing mode.

When one complete image includes a plurality of items of image data, an item of image data is expanded if the item of image data contains an image region that can be printed in the borderless printing mode.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 5 illustrates the original image having a plurality of segments divided by lateral lines;

FIG. 6A illustrates image data when it is divided by vertical lines into a plurality of segments by a plurality of print commands;

FIG. 6B illustrates image data when it is divided by vertical lines and horizontal lines into a plurality of segments by a plurality of print commands;

DETAILED DESCRIPTION OF THE INVENTION

Embodiments of the invention will be described in detail with respect to the drawings.

First Embodiment

Figure 1:
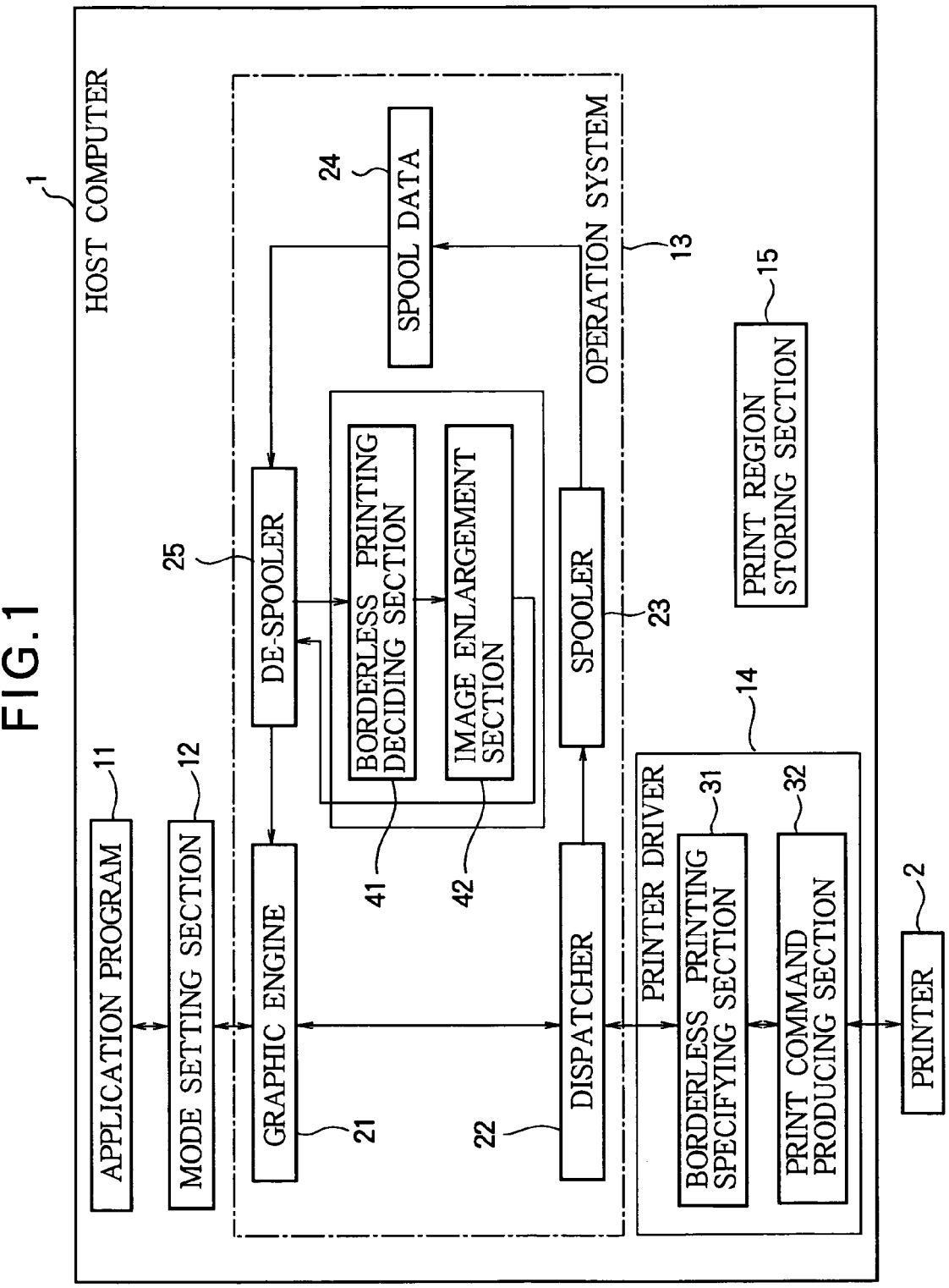
FIG. 1 is a functional block diagram illustrating the configuration of an image forming apparatus according to a first embodiment.

FIG. 1 is a functional block diagram illustrating the configuration of an image processing apparatus according to a first embodiment.

Figure 18:
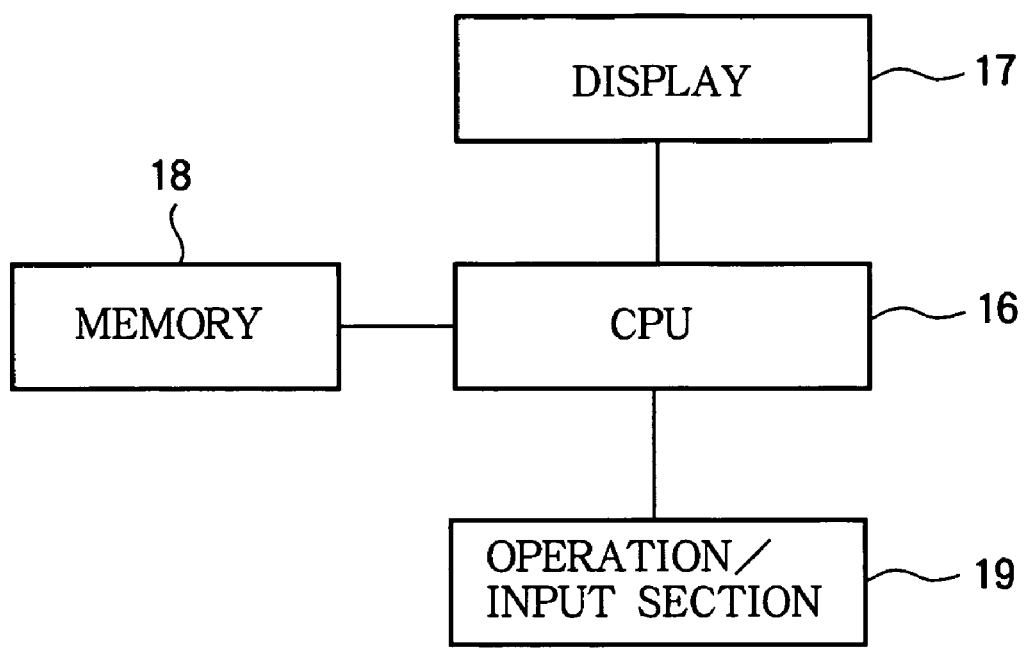
FIG. 18 is a block diagram of the image processing apparatus according to the present invention.

Referring to FIG. 1, a host computer 1 is a host apparatus of a printer 2, and controls the printer 2. The host computer 1 produces an expanded image data for borderless printing, and sends the image data together with a printing command to the printer 2. The host computer 1 includes a microprocessor (CPU) that performs arithmetic operations, a memory, and an operation/input section such as a key board or a mouse, and a display section such as a display as shown in FIG. 18.

The host computer 1 incorporates an application program section 11, mode setting section 12, an operating system 13, a printer driver 14, and a print region storing section 15.

The operating system 13 includes a graphic engine 21, dispatcher 22, spooler 23, spool data 24, de-spooler 25, deciding section 41, and image enlargement section 42. The printer driver 14 further includes a borderless printing mode specifying section 31 and a print command producing section.

The printer 2 includes a print mechanism that receives a print command and enlarged image data from the host computer 1, produces image dot data based on the image data, and prints the image dot data on a medium such as paper.

{Image Processing Apparatus}

The respective blocks of the host computer 1 will be described with reference to FIG. 1. The respective functional blocks 11-42 represent the respective functions that are performed by a CPU when the CPU executes the respective programs stored in a predetermined region in the memory of the host computer 1. The respective programs in FIG. 1, i.e., the application program 11, mode setting section 12, printer driver 14, deciding section 41 and image size magnifying section 42 are executed on the operating system 13.

The application program 11 produces a document in accordance with information inputted by the user through the operation/input section and sends the image data of the produced document together with drawing commands to the graphic engine 21 in the operating system 13.

The mode setting section 12 determines how a borderless printing mode should be selected. The mode setting section 12 prompts the user to determine whether the user determines the borderless printing or the deciding section 41 automatically determines the borderless printing.

The print region storing section 15 previously stores print regions of predetermined media, i.e., the size of the media.

Figure 2:
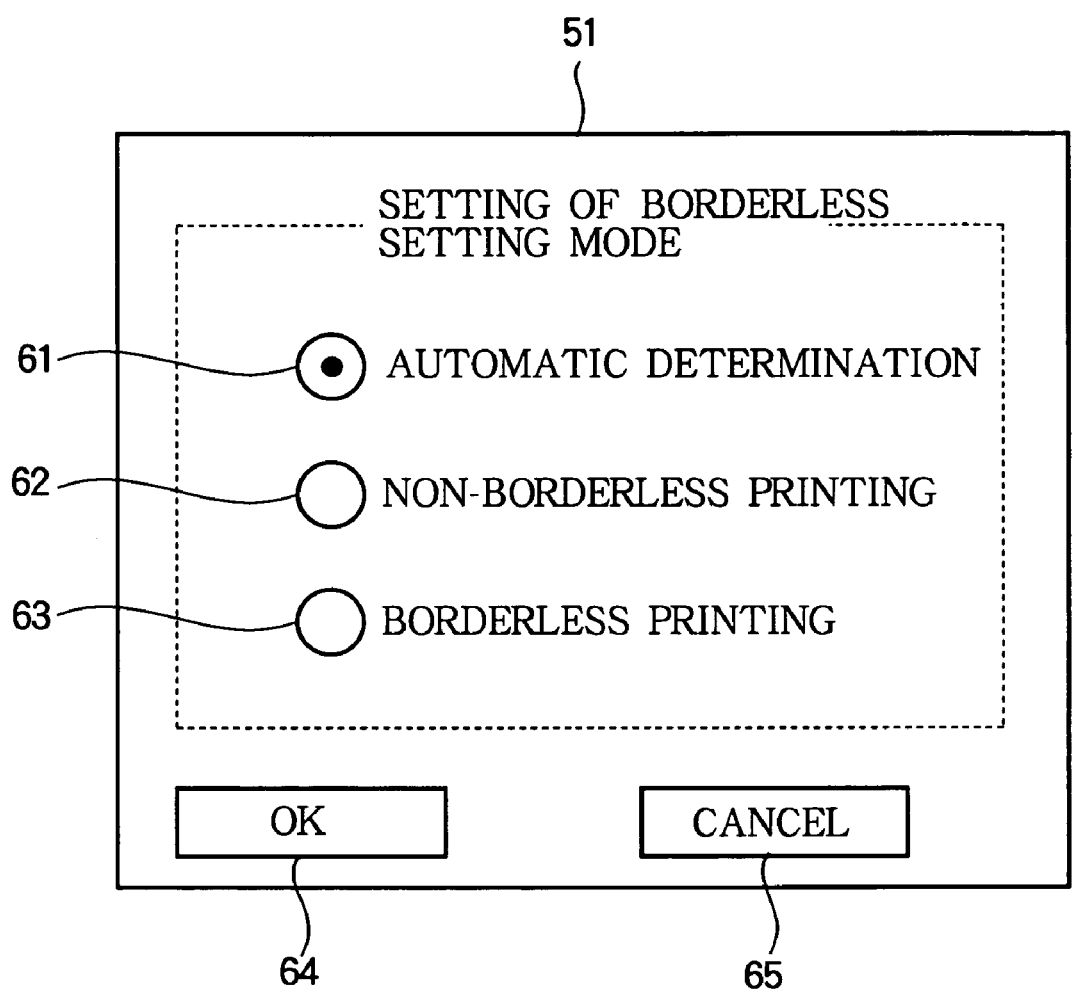
FIG. 2 illustrates an example of a setting-menu screen through which a user specifies a borderless printing mode.

FIG. 2 illustrates an example of a setting-menu screen through which the user specifies the borderless printing mode. A setting-menu screen 51 for selecting a printing mode is displayed on the display section of the host computer 1. The setting-menu screen 51 includes an automatic determination button 61 that specifies that borderless printing should be automatically selected, a non borderless-printing button 62 that is selected by the user not to allow the borderless printing, a borderless printing button 63 that is selected by the user to allow the borderless printing, an OK button 64 that confirms the selection made by the user on the menu screen 51, and a cancel button 65 that invalidates the selection by the respective button made on the setting-menu screen 51.

The mode setting section 12 drives the display section of the host computer 1 to display the setting-menu screen 51, in order to prompt the user to make selection of either the "Automatic judgment is to be made" by default, "A borderless printing is to be performed," or "No borderless printing is to be performed". If the user selects either "A borderless printing is to be performed" or "No borderless printing is to be performed," the processing is carried out in the same manner as the conventional art. The following description will assume the "Automatic determination is to be made" by default.

The operating system 13 performs the basic operations of the host computer 1, i.e., controls the general processes carried out by the CPU, data-inputting operation into a memory and data-outputting operation from the memory, contents inputted through an operation/input section, and a content displayed on the display section. When the operating system 13 receives the image data and drawing commands from the application program 11, the spooler 23 temporarily stores the image data and the de-spooler 25 reads the image data from the spooler 23. By comparing the image region of the image data with the print region of a medium, the deciding section 41 makes a decision to determine whether the image data is to be printed over the entire region of the medium, i.e., printing is to be performed in the borderless printing mode.

If the image data is to be printed in the borderless printing mode, for example, the image data needs to be expanded such that the image data no longer has the upper, lower, left, and right margins and the image region of the expanded image that lies outside the medium size is within a predetermined range. For this reasons, the enlargement ratio in the borderless printing mode needs to be set.

If the medium is smaller in area than the image region of the image data before enlargement, the image data needs to be reduced in area. Reduction of image size is also considered to be a kind of enlargement with an enlargement ratio less than "1." Thus, the term expansion in this specification covers expansion ratio greater than "1" as well as smaller than "1."

The graphic engine 21 receives image data from the application program 11, and temporarily stores image data into the spool data 24 via the spooler 23. The graphic engine 21 also reads the image data from the spool data 24, and expands the image data read from the spool data 24 into image data for the printer driver 14. If it is determined that printing should be performed in the borderless printing mode, the image data read from the spool 24 is converted in to expanded image data.

The dispatcher 22 sorts the data outputted from the graphic engine 21 to different destinations. If the data outputted from the graphic engine 21 is image data for spooling that is outputted from the application program 11, the image data is outputted to the spooler 23. If the data outputted from the graphic engine 21 is the expanded image data for the printer driver 14, the image data is outputted to the print driver 14.

The spooler 23 stores the image data, outputted from the graphic engine 21, into the spool data 24.

The spool data 24 temporarily stores the image data outputted form the spooler 23, and holds the image data until the image data is read out by the de-spooler 25.

The de-spooler 25 reads the image data from the spool data 24, and supplies the image data to the deciding section 41, so that the deciding section 41 determines whether the image data should be printed in the borderless printing mode. If the deciding section 41 determines that the image data should be printed in the borderless printing mode, the image size expanding section 42 converts the image region of the image data into a larger size before sending it to the graphic engine 21.

The deciding section 41 compares the image region of the image data read from the spool data 24 with the print region of the medium. When the image region of the image data is placed over the recording region of the medium, if the upper, lower, left and right margins are not more than 10 mm, the image region of the image data is substantially the same size as the recording region of the medium. In other words, printing is made in the borderless printing.

Figure 3:
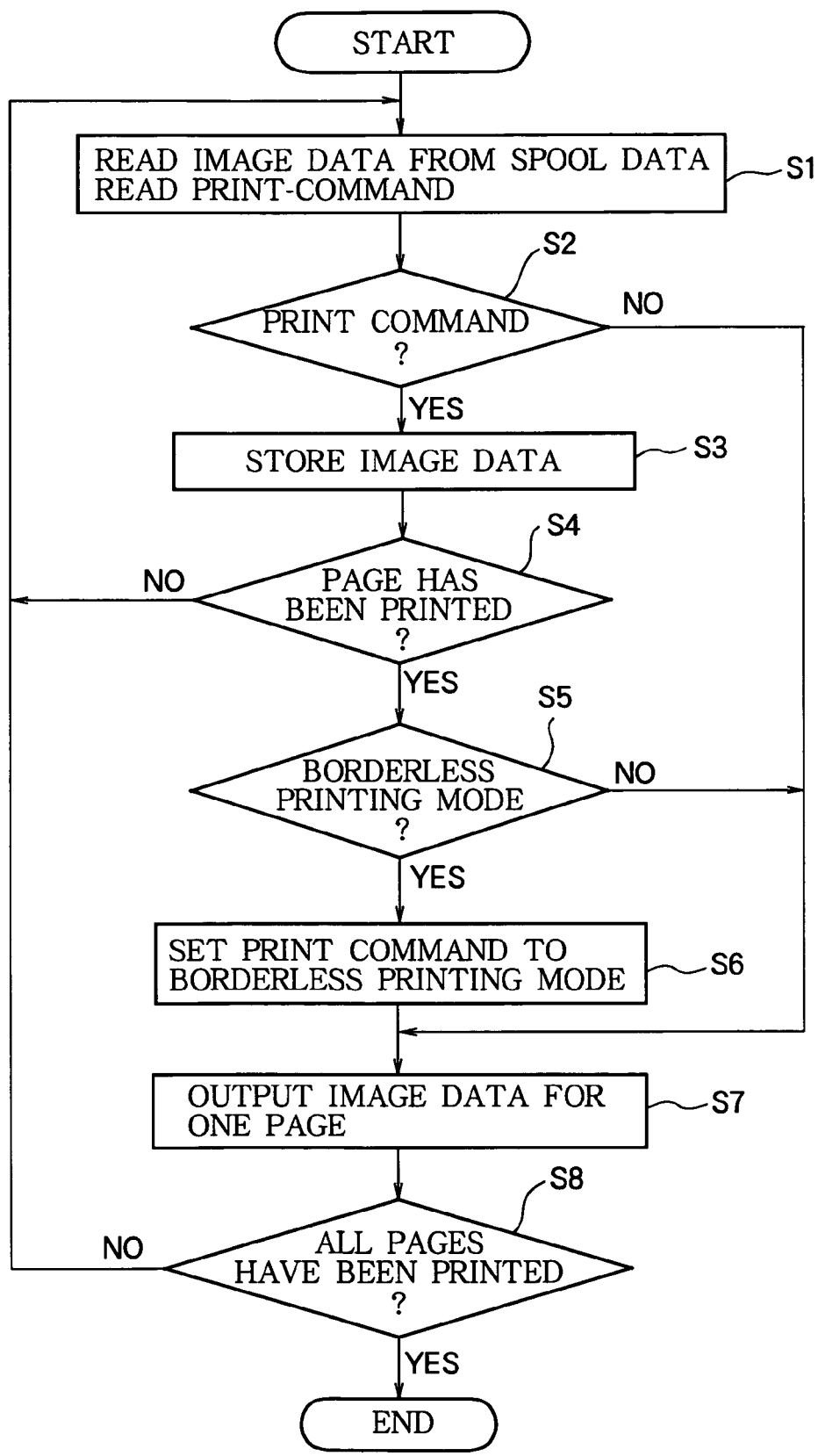
FIG. 3 is a flowchart illustrating the operation of a deciding section.

FIG. 3 is a flowchart illustrating the operation of the deciding section 41. The deciding section 41 reads the image data from the spool data 24 and the drawing commands in sequence (S1), and makes a decision to determine whether the commands read at step S1 are drawing commands (S2).

The flowchart in FIG. 3 assumes that image data is, for example, a photograph that is substantially the same size as the medium, and therefore the image data is printed by a single drawing command. Thus, a single command is checked at step S2.

The drawing command is defined by, for example, the operating system 13 of FIG. 1, and varies depending on the type of the operating system 13. An operating system may have a plurality of drawing commands. A page of data may have a plurality of drawing commands. Even if a page of data contains a plurality of drawing commands, the process in FIG. 3 can be performed provided that a first command for each page received by the deciding section 41 is a drawing command. A description will be given in a second embodiment of a case in which a first command for each page received by the deciding section 41 is not a drawing command.

For the operation system 13, the drawing commands are defined in the following formats.

Figure 4:
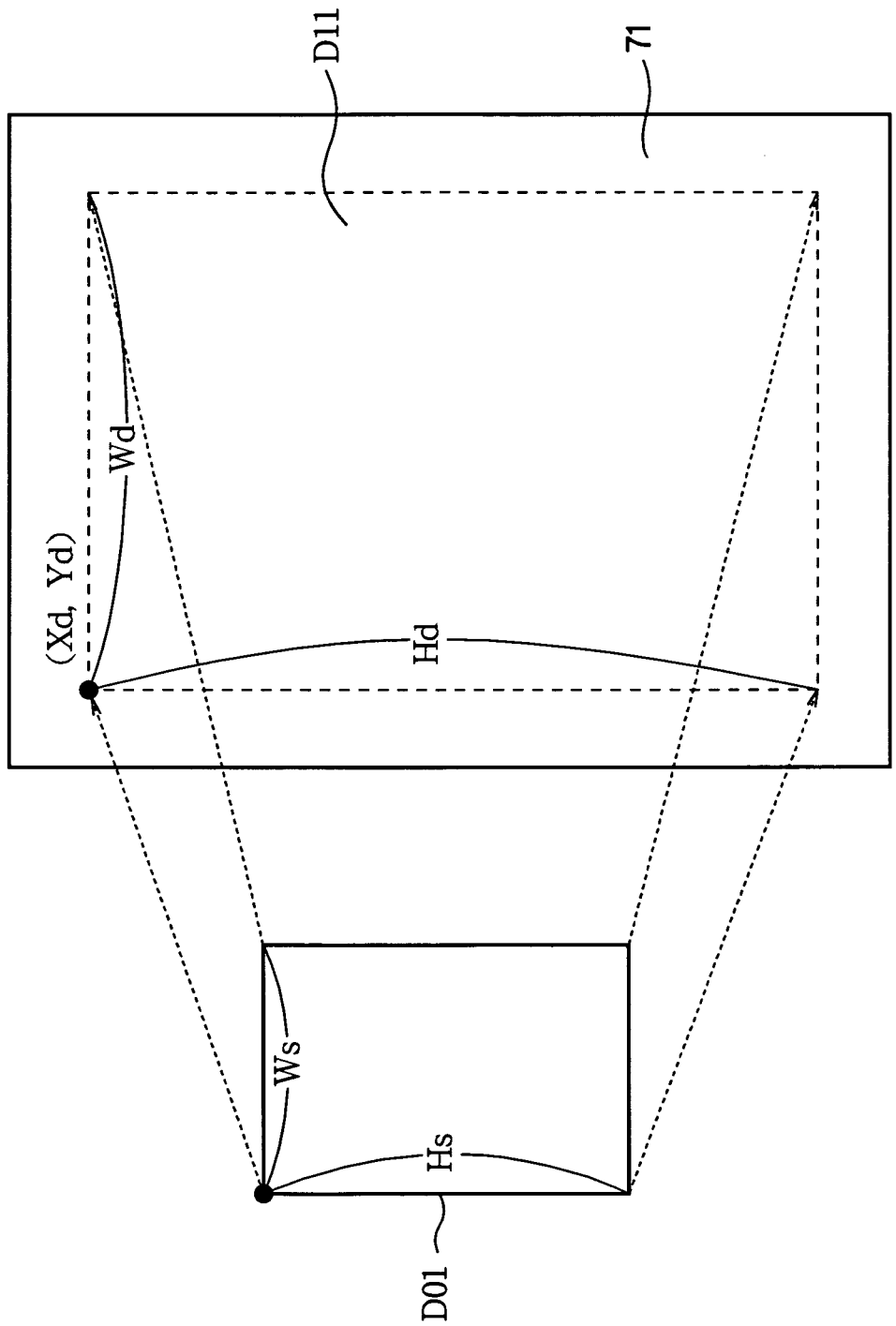
FIG. 4 illustrates original image data printed at a single print command on a medium.

Ws: Width of the original image
Hs: Height of the original image
Xd, Yd: Lateral and vertical positions of printed image
Wd: Width of the printed image
Hd: Height of the printed image FIG. 4 illustrates the original image data printed at a single drawing command and on a medium (e.g., paper). The references in FIG. 4 are those defined by the aforementioned print commands. The image region of the original image data D01 is expressed by a height Hs and a width Ws. The image region of the image data printed on the paper 71 has a height Hd, a width Wd, a lateral image position Xd, and a vertical image position Yd.

FIG. 5 illustrates the original image having a plurality of segments divided by lateral lines. Each of the plurality of laterally sliced segments is attended by a corresponding drawing command. In this case, even if a plurality of commands exist in one page of data, the deciding section 41 can receive the first drawing command for each page and therefore the process in FIG. 3 can be performed.

The original image data is horizontally divided into n segments: Dd01-Dd0n. Thus, the image data printed on the paper 71 are Dd11-Dd1n. Each of the image data to be printed on the paper 71 is represented by the respective print position {Xd, Yd} where n is an integer such that n≧1.

FIG. 6A illustrates image data when it is divided by vertical lines into a plurality of segments by a plurality of drawing commands Referring to FIG. 6A, even if a plurality of commands exist in one page of data, the deciding section 41 may receive the first drawing command for each page, and therefore the process in FIG. 3 can be performed. Thus, the image data to be printed on the paper 71 is divided by vertical lines into data De11-De1n, where n is an integer such that n≧1.

FIG. 6B illustrates image data when it is divided by vertical lines and lateral lines into a plurality of segments by a plurality of drawing commands. Referring to FIG. 6B, even if a plurality of commands exist in one page of data, the deciding section 41 may also receive the first drawing command for each page, and therefore the process in FIG. 3 can be performed. The image data to be printed on the paper 71 are divided by vertical lines and horizontal lines into data Df11-Df1n, where n is an integer such that n≧1.

As described above, even when the original image data is divided into a plurality of segments and each of the segments is printed on the medium under control of a corresponding drawing command, the segments of image data can be printed as a single overall image on the medium provided that the deciding section 41 can receive the first drawing command for each page and the expanded image data has substantially the same size as the medium. Thus, it can be said that the image data can be printed on a medium (e.g., paper) at a single drawing command.

If the command read from the spool data 24 is not a drawing command (NO at step S2), it is determined that printing is not to be performed in the borderless printing mode. Thus, the borderless printing is not performed and the program proceeds to step S7.

If the command read from the spool data 24 is a drawing command (YES at step S2), the image data that can be printed under that drawing command is stored (S3). Then, a check is made to determine whether the page has been printed under that drawing command (S4). If the printing of the page has not been completed yet (NO at step S4), the program returns to steps S1 to repeat the reading of the printing command and storage of the image data. If the printing of that page has been completed (YES at step S4), a check is made to determine whether the upper, lower, left, and right margins of the image data are, for example, not more than 10 mm as compared to the size of the medium, i.e., whether the printing should be performed in the borderless printing mode (S5).

If the image data does not occupy as large an area as the entire area of the medium (NO at S5), it is determined that the printing should not be performed in the borderless printing mode, and the program proceeds to step S7. If the image data occupies as large an area as the entire area of the medium (YES at S5), it is determined that the printing should be performed in the borderless printing mode, and the, the printing command is set to the borderless printing mode (S6) and the image data for one page in the borderless printing mode is outputted to the image enlargement section 42 (S7).

The image data outputted at step S7 is checked to determine whether the image data for all pages of a current print job stored in the spool data 24 has been outputted to the image enlargement section 42. If all of the pages has not been outputted yet (NO at S8), the program returns to step S1 to repeat steps S1-S7. If all of the pages has been outputted. (YES at S8), the deciding section 41 completes its processing.

When the deciding section 41 determines that the image data should be printed in the borderless printing mode, the image enlargement section 42 expands the image data such that the upper, lower, left and right margins no longer exist and a peripheral area of the image data that lies outside of the medium is within a predetermined range (e.g., the distance between edge of the medium and the outer most perimeter of the image region of the image data is, for example, 3 mm). In other words, the enlargement ratio in the borderless printing mode is determined and the enlargement process is carried out.

Figure 7:
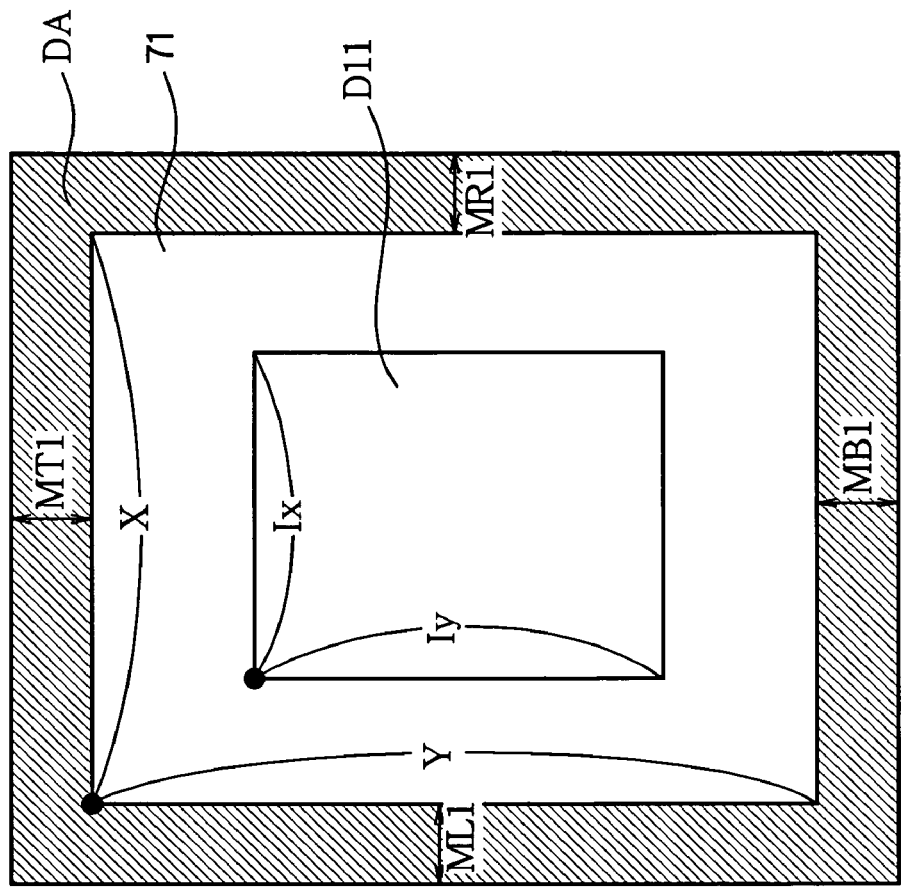
FIG. 7 illustrates an example of an image region of the image data in the borderless printing mode.

FIG. 7 illustrates an example of an image region of the image data in the borderless printing mode. A white arrow indicates the direction of travel of the medium (e.g., paper).

X: the horizontal (left to right) dimension of the paper 71.
Y: the vertical (upward to downward) dimension of the paper 71
Ix: the horizontal (left to right) dimension of the original image data D11
Iy: the vertical (upward to downward) dimension of the original image data D11
MT1: expanded width of a top portion of the image region DA for the borderless printing, the expanded width MT1 being larger than the paper 71
ML1: expanded width of a left portion of the image region DA for the borderless printing, the expanded width ML1 being larger than the paper 71

MR1: expanded width of a right portion of the image region DA for the borderless printing, the expanded width MR1 being larger than the paper 71

MB1: expanded width of a lower portion of the image region DA for the borderless printing, the expanded width MB1 being larger than the paper 71

The image region of the image data is not necessarily the same shape as the print region of the medium. Thus, If the image data is to be expanded such that the upper, lower, left, and right margins no longer exist with respect to the dimension of the medium, the image data may have to be expanded such that the expanded image contains larger unnecessary portions in the vertical direction than in the horizontal direction (left to right) or the expanded image contains larger unnecessary portions in the horizontal direction than in the vertical direction.

Figure 8:
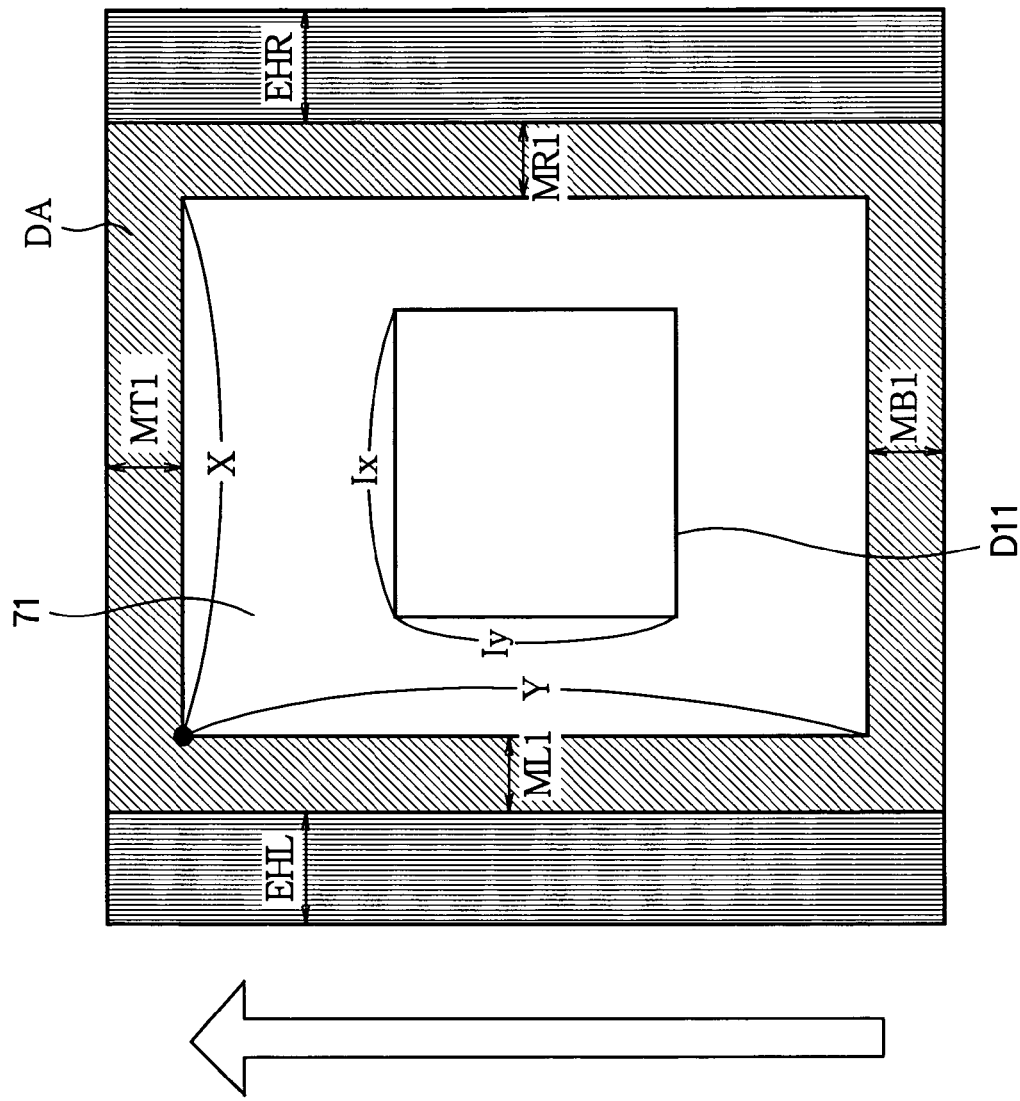
FIG. 8 illustrates an example of an image region of the image data in the borderless printing mode when the image data is to be expanded such that the expanded image has larger unnecessary portion in the horizontal direction than in the vertical direction.

FIG. 8 illustrates an example of an image region of the image data in the borderless printing mode when the image data is expanded such that the expanded image contains larger unnecessary portions in the horizontal direction than in the vertical direction. The X, Y, Ix, Iy, MT1, ML1, MR1, MB1, and direction of travel of the medium are the same as those in FIG. 7.

EHR represents the width of a right unnecessary portion of the expanded region.

EHL represents the width of a left unnecessary portion of the expanded region.

Figure 9:
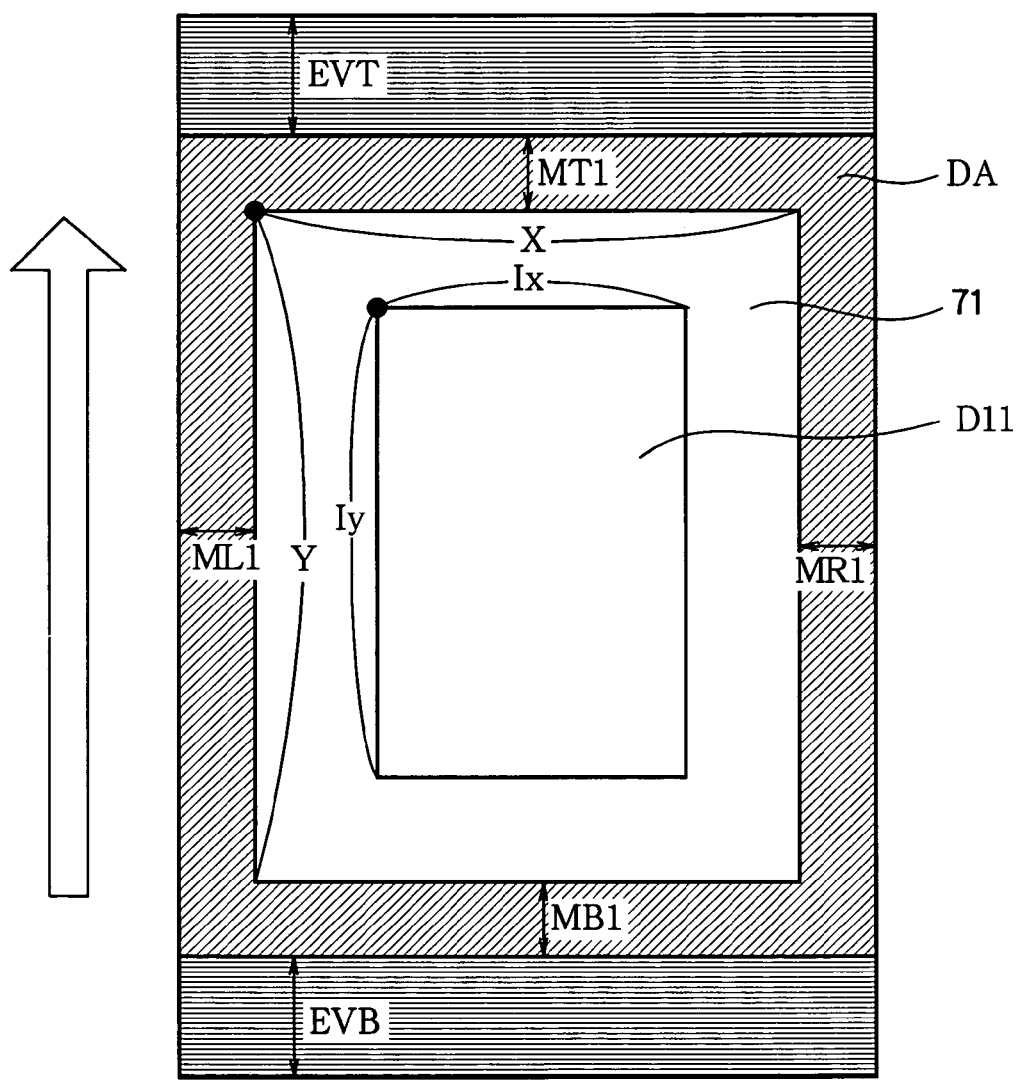
FIG. 9 illustrates an example of image region of the image data in the borderless printing mode when the image data is to be expanded such that the expanded image has larger unnecessary portion in the vertical direction than in the horizontal direction.

FIG. 9 illustrates an example of image region of the image data in the borderless printing mode when the image data is to be expanded such that the expanded image has larger unnecessary portions in the vertical direction than in the horizontal direction. The X, Y, Ix, Iy, MT1, ML1, MR1, MB1, and direction of travel of the medium are the same as those in FIG. 7.

EVT represents the width of an upper unnecessary portion of the expanded region.

EVB represents the width of a lower unnecessary portion of the expanded region.

For example, when the image data has a smaller aspect ratio than the medium, if the image data is expanded vertically in an attempt to eliminate margins, the image has to be expanded such that the expanded image has larger unnecessary portions in the horizontal direction than in the vertical direction (FIG. 8). Likewise, when the image data has a larger aspect ratio than the medium, if the image data is expanded horizontal in an attempt to eliminate margins, the image has be expanded such that the expanded image has larger unnecessary portions more in the vertical direction than in the horizontal direction (FIG. 9).

Figure 10:
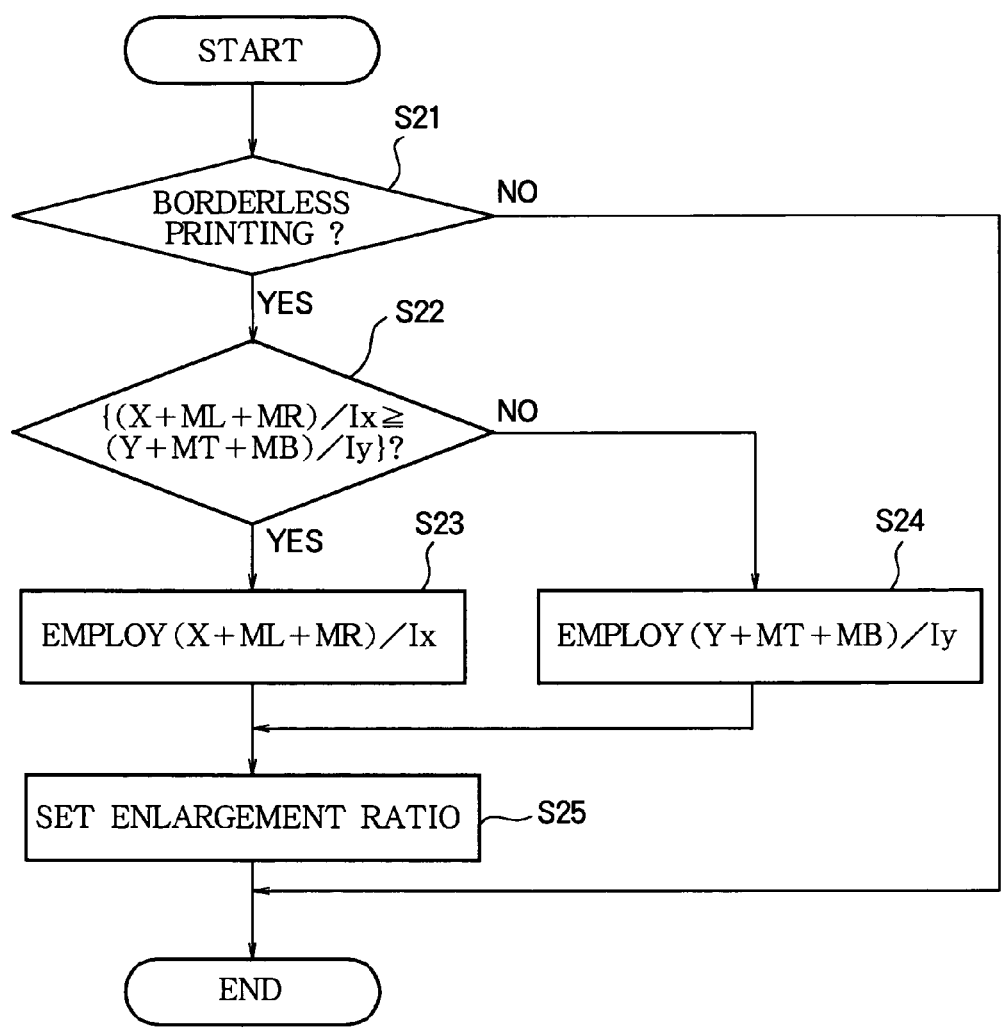
FIG. 10 is a flowchart illustrating the operation of an image enlargement section in FIG. 1.

FIG. 10 is a flowchart illustrating the operation of the image enlargement section 42 in FIG. 1.

The image enlargement section 42 makes a decision based on the drawing command input from the deciding section 41 to determine whether printing should be preformed in the borderless printing mode (S21). If the printing should not be performed in the borderless printing mode (NO, at step S21), then the program ends. If the printing should be performed in the borderless printing mode (YES, at step S21), a check is made to determine whether the expansion should be made in the lateral direction or in the vertical direction before printing is carried out in the borderless printing mode. (S22). Specifically, a larger expansion ratio is employed.

If the enlargement ratio is larger in the horizontal direction than in the vertical direction (YES at S22), then the horizontal expansion ratio (i.e., $(X+ML+MR)/I_x$) is employed (S23). If the expansion ratio is larger in the vertical direction than in the horizontal direction (NO at S22), then the vertical enlargement ratio (i.e., $(Y+MT+MB)/I_y$) is employed (S24).

Once the enlargement ratio in the borderless printing mode is determined, the image data is expanded in its vertical and horizontal dimensions according to the enlargement ratio (S25).

When the image data is expanded by the image enlargement section 42, the de-spooler 25 provides the expanded image data to the graphic engine 21. The graphic engine 21 converts the received expanded image data into expanded data for print driver 14, before sending it together with the drawing commands. The dispatcher 22 outputs the expanded image data to the print driver 14.

Taking into account whether the medium is transported in a portrait orientation or in a landscape orientation and whether the image data expanded in the operating system 13 is excessive in the vertical direction or in the lateral direction, the printer driver 14 sets the print region for the printer 2 in the borderless printing mode, and produces a print command such that an unnecessary portion of the expanded image data is discarded.

The borderless printing mode specifying section 31 produces a print command that commands to discard an unnecessary portion of the expanded image which would otherwise cause detrimental effects.

For example, when the expanded image is in a landscape orientation, if the medium is fed in a portrait orientation into the printer such that the center of the medium coincides with the center of the expanded image region, the beginning of the expanded image region substantially coincides with the leading edge of the medium. Thus, the unnecessary portion of the expanded image in the lateral direction presents no problem. Thus, the control by the print command is not required in the borderless printing mode. However, when the expanded image is in a portrait orientation, if the medium is fed in a portrait orientation into the printer such that the center of the medium coincides with the center of the expanded image region, the beginning of the expanded image region may not substantially coincide with the leading edge of the medium. In other words, the print position in a vertical direction of an expanded image region is quite different from the leading end of the medium. Thus, a print command is produced so that the unnecessary portion of the image data expanded in the vertical direction is discarded in the borderless printing mode.

When the medium is transported in a landscape orientation within the printer 2, a print command is produced such that the aforementioned relations of control are reversed.

Taking into account whether the medium is transported in a portrait orientation or in a landscape orientation and whether the expanded image data exceeds the print region of the medium by a large amount in one of the vertical direction and the horizontal direction than in the other of the vertical direction and the horizontal direction, the borderless printing mode specifying section 31 sets a print region of the medium in the borderless printing mode, and produces a print command such that an unnecessary portion of the expanded image data is discarded.

A printing command producing section 32 produces a print command for the printer 2 based on the received image data, and then transmits the print command to the printer 2.

Figure 11:
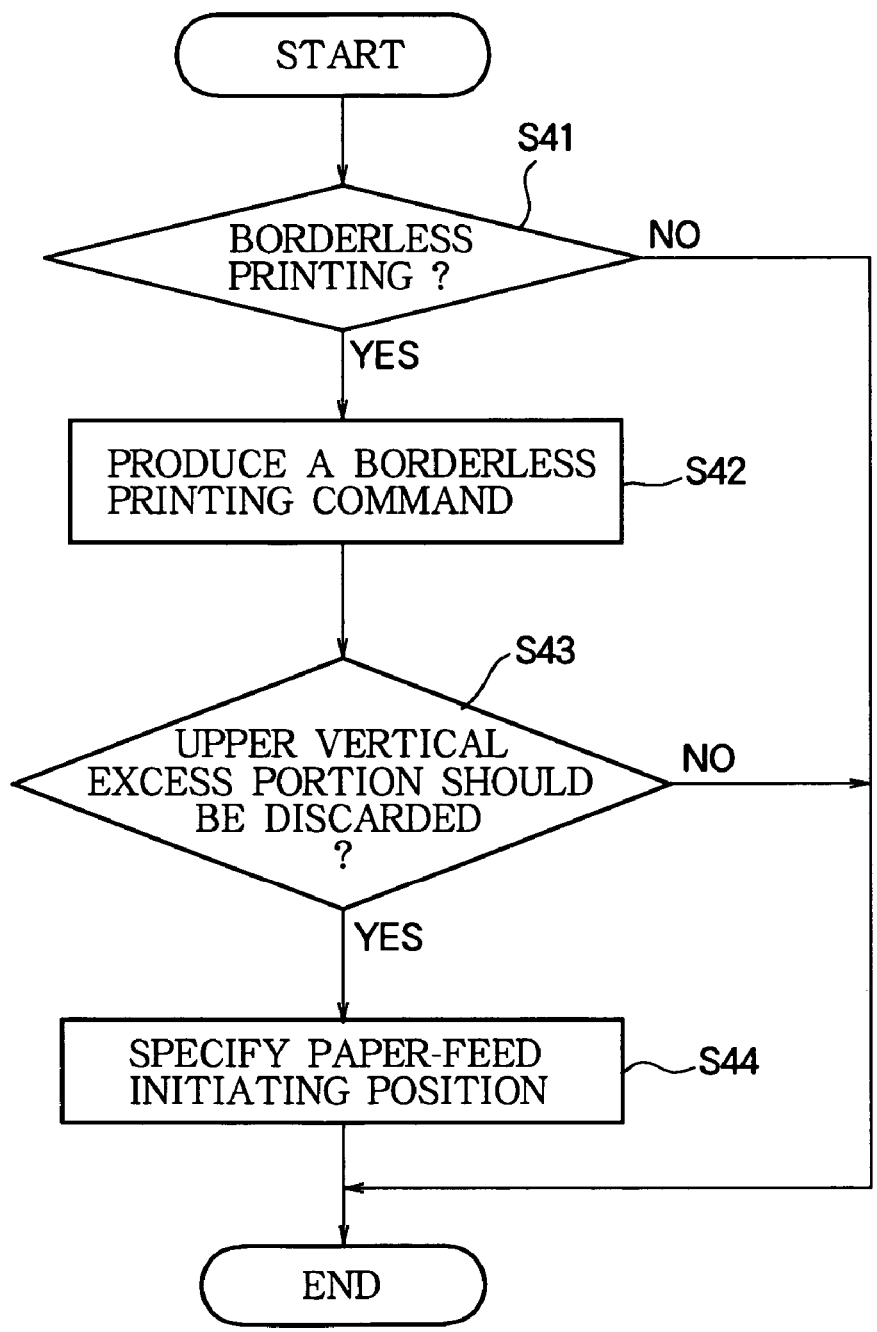
FIG. 11 is a flowchart illustrating the operation of the borderless printing mode specifying section.

FIG. 11 is a flowchart illustrating the operation of the borderless printing mode specifying section 31. The borderless printing mode specifying section 31 receives the expanded image data and the drawing command from the graphic engine 21, and then makes a decision based on the drawing command to determine whether the printing should be performed in the borderless printing mode (S41).

If the printing should not performed in the borderless printing mode (NO at step S41), the program ends. If the printing should be performed in the borderless printing mode (YES at step S41), a borderless printing mode setting command is produced (S42) and then a check is made to determine whether an upper vertical unnecessary portion of the expanded image data should be discarded (S43).

If an upper unnecessary portion of the expanded image data is not to be discarded (NO at step S43), the program ends. If an upper unnecessary portion of the expanded image data is to be discarded (YES at step S43), a command to specify a paper-feed initiating position is sent to the printer 2, so that the upper unnecessary portion of the expanded image data is not printed.

Referring to FIG. 1, the printing command producing section 32 produces a command to cause the printer 2 to print the expanded image data. This command is based on the borderless printing setting command, command to specify a paper-feed initiating position command, and expanded image data received from the borderless printing mode specifying section 31, and transmits the command to the printer 2. When the printer 2 receives the expanded image data and a command that specifies the borderless printing mode, the printer 2 produces print data without clipping the expanded data or determining printing mode (normal printing mode or borderless printing mode). Then, printing is performed according to the paper-feed initiating position command.

As described above, the image processing apparatus according to the first embodiment includes the host computer 1 and the printer 2. The host computer 1 produces image data and drawing commands necessary for image formation, and then converts the image data and the print command into image data with print commands. The printer 2 receives the image data from the host computer 1, and prints the image on the medium. The host computer 1 includes the deciding section 41, image enlargement section 42, and borderless printing mode specifying section 31. The deciding section 41 compares the dimensions of image data outputted from the application program 11 with the dimensions of the medium, thereby determining whether the image data contains an image region that can be printed in the borderless printing mode. When the deciding section 41 determines that the image data can be printed in the borderless printing mode, the image enlargement section 42 expands the image data into image data having an expanded image region larger than the print region of the medium by a compensation of an error in print position resulting from transportation of the medium. The borderless printing mode specifying section 31 produces a command to specify paper-feed initiating position in order to control image region of the expanded image data.

When the upper, lower, left and right margins of the image region of the image data are smaller than those of the recording region of the medium by a predetermined value (e.g., 10 mm), respectively, the deciding section 41 determines that the image data has an image region such that printing can be carried out in the borderless printing mode.

When the image region of the image data is placed on the recording region of the medium one over the other, if the upper, lower, left and right margins of the image region of the image data are smaller than those of the recording region of the medium by a predetermined value (e.g., 10 mm), respectively, the deciding section 41 determines that the image data has an image region such that printing can be carried out in the borderless printing mode.

The borderless printing mode specifying section 31 produces a command to allow the paper feed initiating position to be delayed by an unnecessary portion of an image region, so that an unnecessary portion of the image region is not printed when the expanded image data is printed.

The first embodiment employs the mode setting section 12 that selects either an automatic mode where the deciding section 41 automatically determines the borderless printing mode or a user-selection mode where the user selects the borderless printing mode.

As described above, if the expanded image data can be printed on a page of medium, printing can be carried out regardless of whether the borderless printing is specified, the printing can be carried out automatically in the borderless printing mode.

Second Embodiment

In the first embodiment, at step S2 where a command outputted from the application program is analyzed, if the deciding section 41 determines that a received command is not a drawing command, the read command is not a command to print image data and therefore the program ends. However, when one page of data contains a plurality of commands, the first command received by the deciding section 41 may not be the drawing command. More specifically, the image data may contain a background image that occupies the entire image region of the image data, and characters and arbitrary graphics are to be written on the background image, in which case, if the deciding section 41 receives the character data, the deciding section 41 will determine that a received command is not a drawing command. As a result, printing cannot be performed in the borderless printing mode.

A second embodiment is characterized in that when image data contains a plurality of commands in one page of data, the print commands first received by a deciding section 41 is not a drawing command, printing can be performed in the borderless printing mode.

The general configuration in the functional block diagram is basically the same as that in FIG. 1 except that the operation of the deciding section 41 is different.

Figure 12:
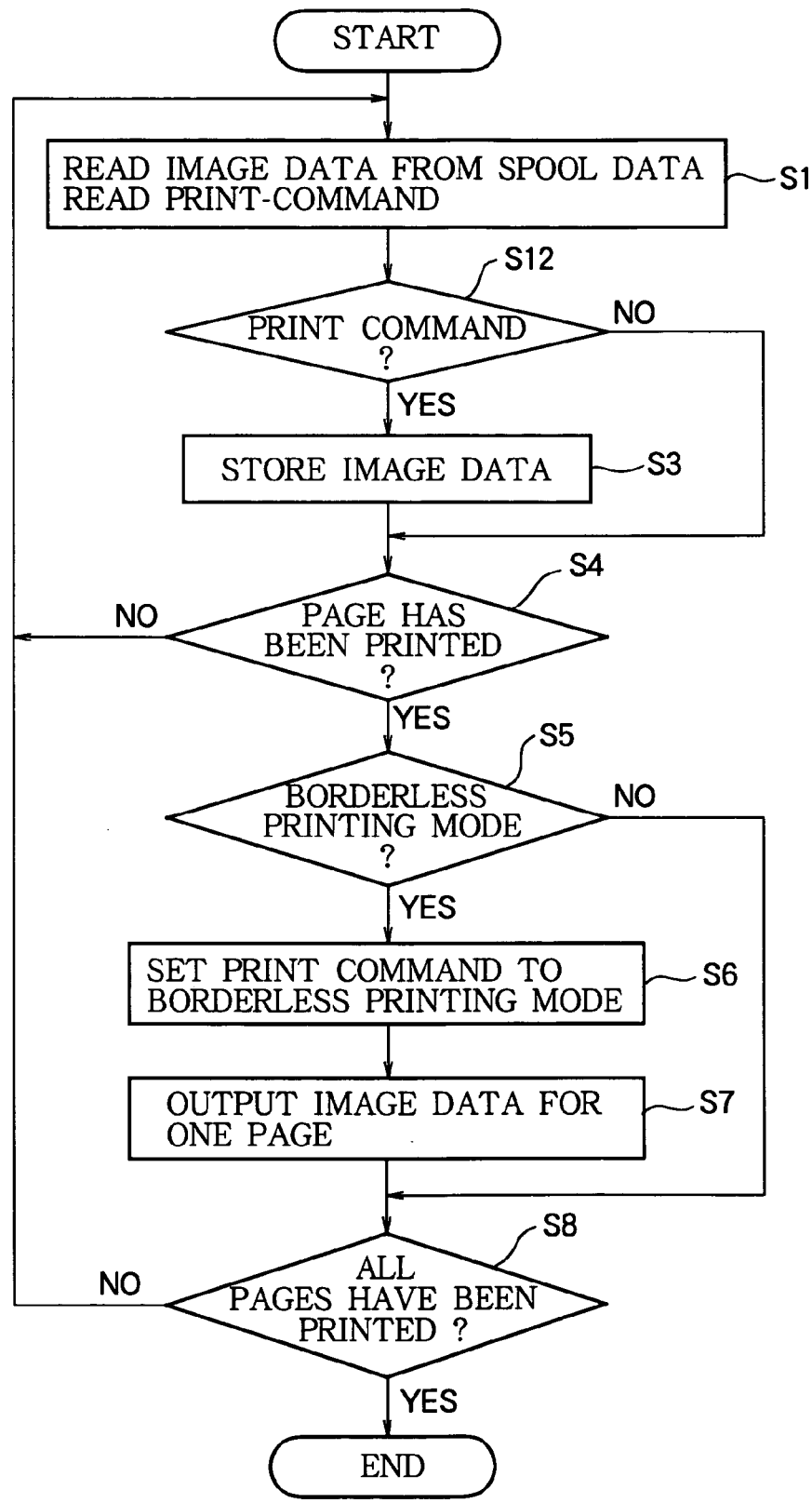
FIG. 12 is a flowchart illustrating the operation of the deciding section.

FIG. 12 is a flowchart illustrating the operation of the deciding section 41. The operation of the deciding section 41 is substantially the same as that described with respect to FIG. 3, and differs only from that in FIG. 3 when the answer at step S12 is NO.

Specifically, if the command read from the spool data 24 is not a drawing command (NO at step S12), it is determined that the command read from the spool data 24 is not a normal command to print but printing of that page may be required in the borderless printing mode. Thus, a decision is made to determine whether the printing under that command has been completed (S4). This is to read the next command that may be a normal print command. If the answer at step S12 is YES, the image data under the control of the command read from the spool data 24 is stored.

In other words, if the answer at step S12 is NO, the next command is read to determine whether printing should be performed in the borderless printing mode.

When an image includes a plurality of items of image data outputted from the application program., the deciding section 41 makes a decision for each of the plurality of items of image data to determine whether the item of image data has an image region that can be printed in the borderless printing mode.

As described above, when the image data contains a background image that occupies the entire image region of the image data, and characters and arbitrary graphics are to be written on the background image, checking a single command is not enough to reliably determine that the image data can be printed in the borderless printing mode.

The second embodiment makes it possible to check all of the commands in the image data, thereby allowing reliable finding of a command to print. This allows the printer to determine the image data to be a piece of image having substantially the same size as the medium.

Third Embodiment

With the image forming apparatus according to the second embodiment, when image data for one page contains a plurality of commands and a command received first by the deciding section 41 is not a drawing command, a decision is made automatically before printing is performed in the borderless printing mode. For example, if the characters, which are to be printed on the background image, are expanded by the same magnification as the background image, characters in the vicinity of the edge of the image region may be cut off at the edge of the medium.

An image processing apparatus according to a third embodiment performs printing in the borderless printing mode just as in the second embodiment and the characters that are to be written on the background are not expanded, so that the characters will not be cut off at the edges of the medium.

The general configuration of the functional block diagram is basically the same as that in FIG. 1 except that the operation of the image enlargement section 42 is different.

Figure 13:
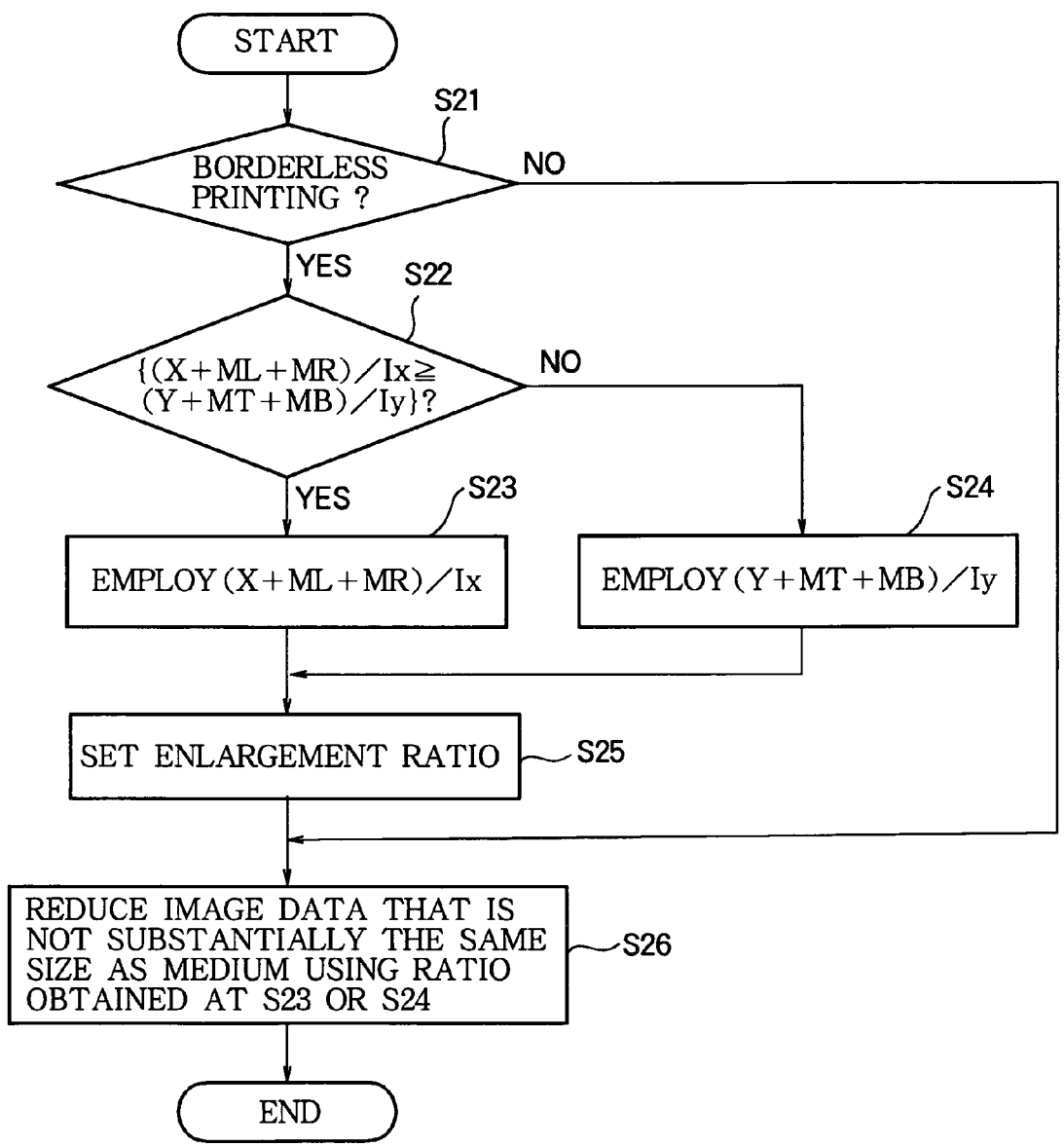
FIG. 13 is a flowchart illustrating the operation of an image enlargement section according to a third embodiment.

FIG. 13 is a flowchart illustrating the operation of an image enlargement section 42 according to the third embodiment. The operation of the image enlargement section 42 is substantially the same as that described with respect to FIG. 10, and differs only from that at step S26 in FIG. 10 where, for example, the characters expanded at step S25 is reduced to the original size.

Specifically, once the magnification in the borderless printing mode is determined, a setting is made to enlarge all of the image data according to the determined enlargement ratio (S25). Image data, except for the background that is printed as a single piece of image of substantially the same size as the medium (paper) is reduced by a magnification set at S25 (i.e., multiplied by 1/magnification) so that the image data is of the original size (S26).

As described above, of a plurality of items of image data that constitute one complete image, only items of image data that can be printed in the borderless printing mode is enlarged by the image enlargement section 42. A decision may be made to determine whether the data describes characters or image, and only the image may be printed in the borderless printing mode.

In the present embodiment, even when a portion of an enlarged image is cut off in the vicinity of the end of the image, the overall background portion may be enlarged for the borderless printing mode, but the remaining part except the background portion can be reduced back to its original size. As a result, the image can be printed in the borderless printing without some portions such as characters cut off from the image.

Fourth Embodiment

In the third embodiment, portions of the image in the vicinity of the end of the image may still be cut off due to positional errors encountered during the transportation of the medium in the apparatus, in which case, printing should not be performed in a borderless printing mode.

A fourth embodiment has a feature that a print result is displayed as a preview assuming that the image has been in the borderless printing mode. Thus, the user can be assured that portions of the image in the vicinity of the end of the image are not cut off.

The general configuration in the functional block diagram of the fourth embodiment is basically the same as that in FIG. 1 except that an image enlargement section 42 operates in a different way.

Figure 14:
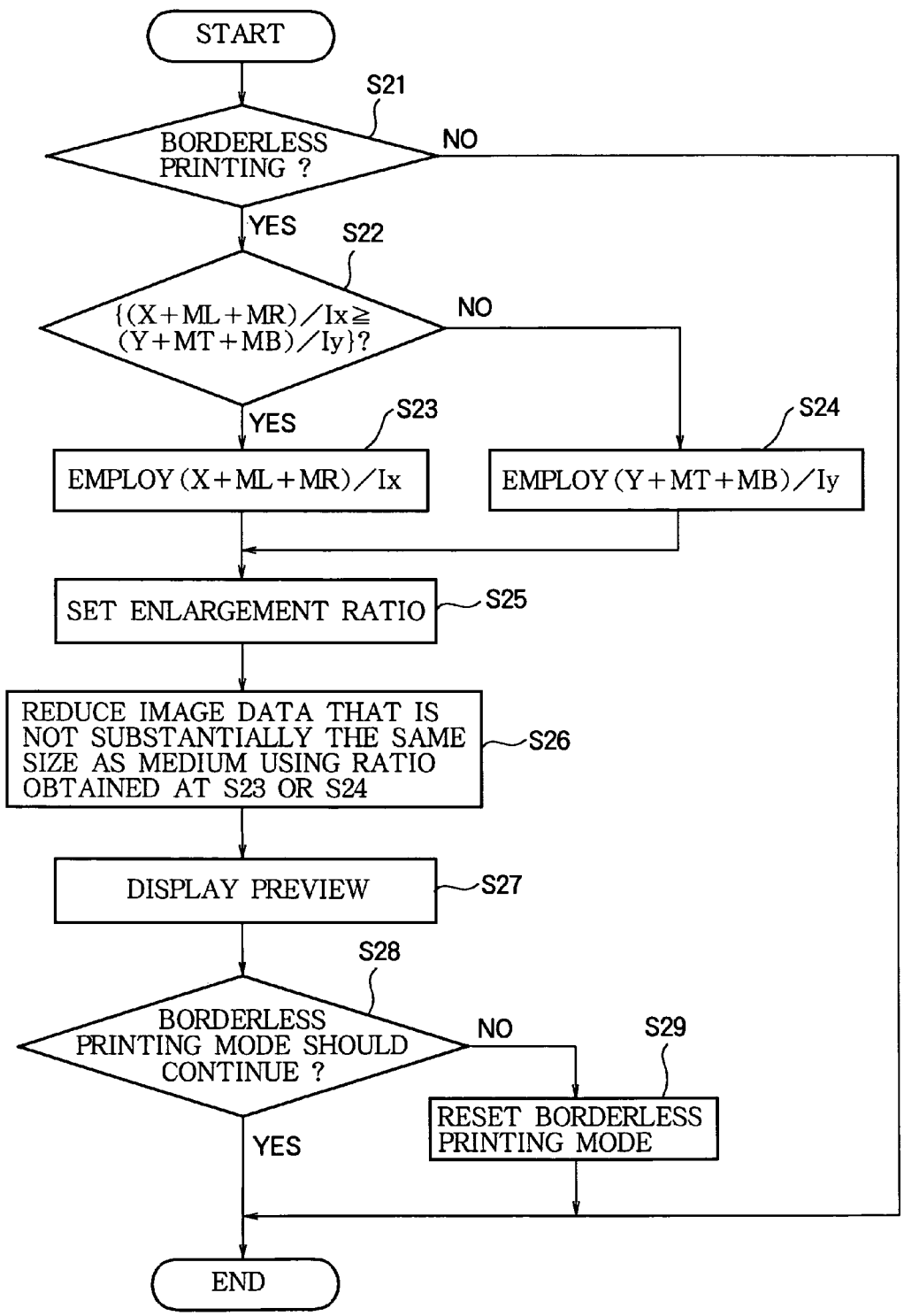
FIG. 14 is a flowchart illustrating the operation of the image enlargement section according to a fourth embodiment.

FIG. 14 is a flowchart illustrating the operation of the image enlargement section 42 according to the fourth embodiment. The operation of the image enlargement section 42 is substantially the same as that described with respect to FIG. 13, and differs from FIG. 13 only in the operation at S27 onward where a preview is displayed to allow the user to decide to either continue the borderless printing or reset the borderless printing.

Specifically, the vertical and horizontal dimensions are expanded according to the enlargement ratio for the borderless printing (S25), and then the items of image data except for the background portion are reduced back to the original size (S26). Then, the preview of the region that falls within the medium size is displayed (S27). The preview image has an image region on the inner side of the upper, lower, left and right margins that may be cut off if the borderless printing is performed. Then, the user is prompted to decide whether the borderless printing should be continued (S28). If the borderless printing should not be continued, the user resets the borderless printing mode (S29).

Figure 15:
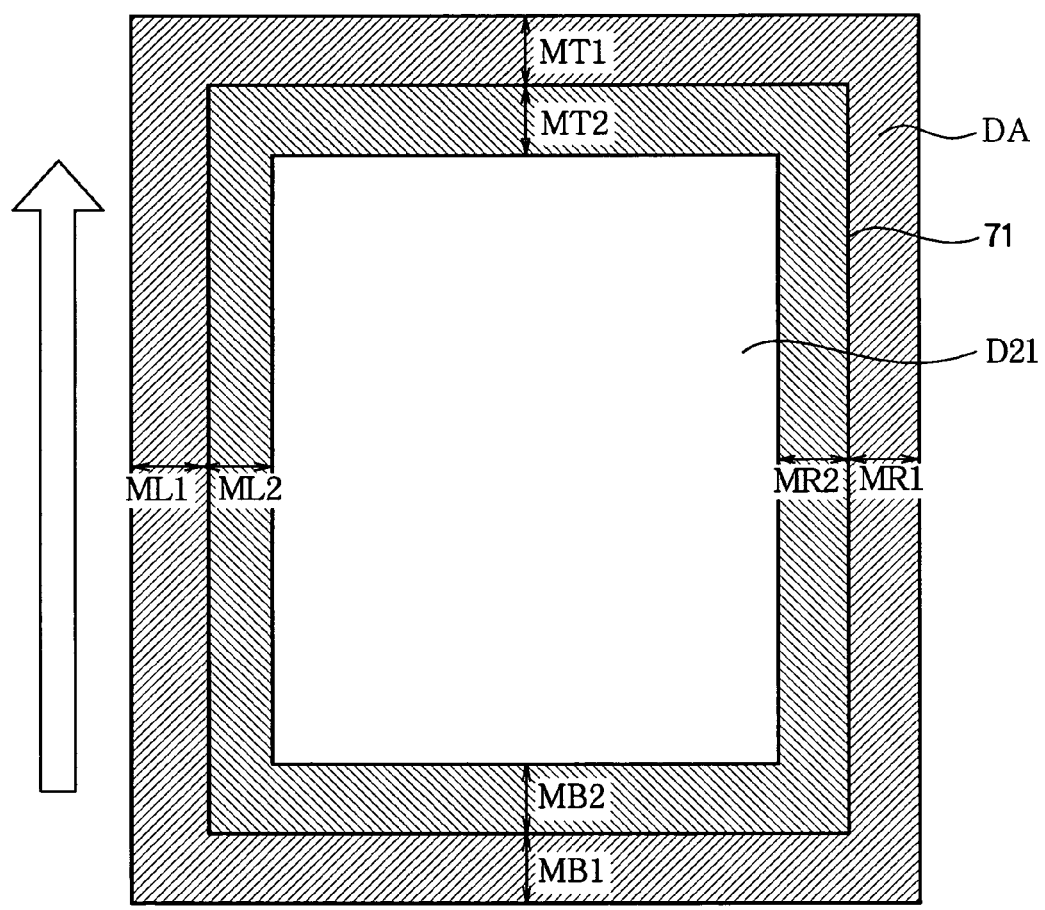
FIG. 15 illustrates an image region that is displayed for preview at step S27 of FIG. 14.

FIG. 15 illustrates an image region that is displayed for preview at step S27 of FIG. 14. Referring to FIG. 15, the paper 71 has a size or an image region DA just enough to contain all the image data after enlargement, including portions MT1, MB1, MR1 and ML1, which exceed the original image region. The portions MT2, MB2, MR2, and ML2 are image regions that may be cut off if the borderless printing is performed. The image region 21 is an image region on the inner side of the portions MT2, MB2, MR2, and ML2. It is to be noted that the MT1, MB1, MR1 and ML1 are the same values as the MT2, MB2, MR2, and ML2, respectively. The image region 21 is displayed as a preview.

Once the preview is displayed, a check is made to determine whether the borderless printing mode should be continued (S28). If the borderless printing should be continued (YES at step S28), the process by the image enlargement section 42 ends. If the borderless printing should not be continued (NO at step S28), the borderless printing mode is reset and then the program returns to a normal bordered printing mode (S29).

As described above, the host computer 1 according to the fourth embodiment includes an operation/input section and a display capable of displaying the image region of the enlarged image data. When the deciding section 41 determines that the image data contains an image region that can be printed in the borderless printing mode, only an image region after enlargement that can reliably be printed is displayed for preview.

The preview feature allows the user to carry out the borderless printing only after he is assured that no portion will be cut off in the vicinity of the end of the medium in the borderless printing mode.

Fifth Embodiment

It may be the case that primary image information exists only in the middle portion of the image and secondary image information exists in the vicinity of the upper, lower, left and right margins. A preview is not necessary if an image is homogeneous design in its entirety, in which case the printing efficiency may be better if a preview screen is not displayed. For example, it may not be very often in the first and third embodiments that the primary information such as characters is cut off in the upper, lower, left and right margins. Thus, preview is not strictly necessary. However, it is more often in the second embodiment that the primary information such as characters is cut off in the upper, lower, left and right margins. Therefore, preview is often necessary.

A fifth embodiment has a feature that a user makes selection as to whether a preview is to be performed.

The general configuration in the functional block diagram of the fifth embodiment is basically the same as that in FIG. 1 except that the operation of an image enlargement section 42 is different.

Figure 16:
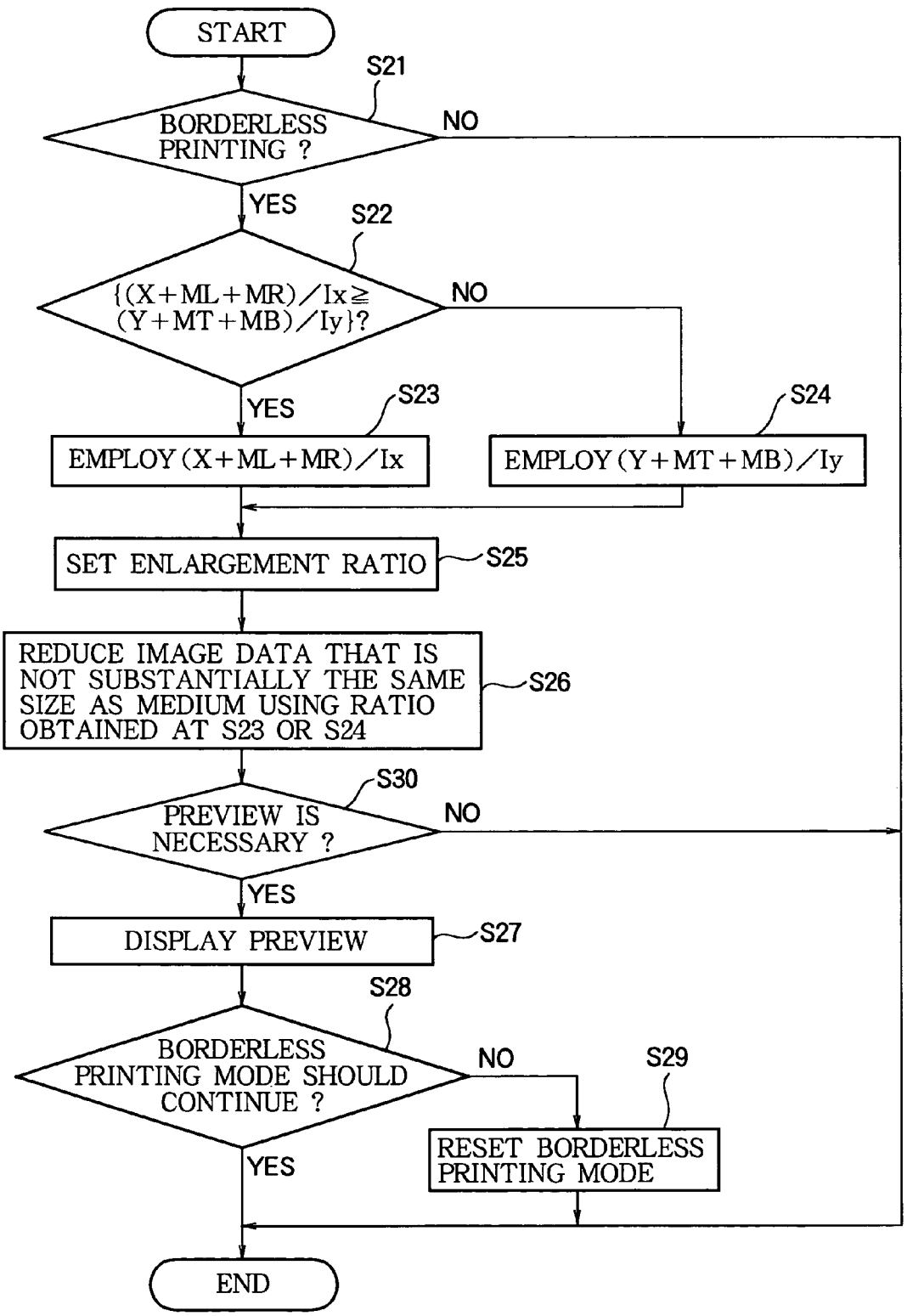
FIG. 16 is a flowchart illustrating the operation of the image enlargement section according to a fifth embodiment.

FIG. 16 is a flowchart illustrating the operation of the image enlargement section 42 (FIG. 1) according to the fifth embodiment.

The operation of the image enlargement section 42 is substantially the same as that described with respect to FIG. 14, and differs from FIG. 14 only in that a decision step is inserted between steps S26 and S27.

Specifically, the vertical and horizontal dimensions are expanded (S25), and then the items of image data except for a background portion are reduced to the original size (S26). Then, a selection screen is displayed on the host computer 1 asking the user whether preview is necessary (S30). If the user selects "preview unnecessary" (NO at step S30), the operation of the image enlargement section 42 is terminated. If the user selects "preview necessary," (YES at step S30), an image region that can be reliably printed is displayed for preview (step S27).

As described above, the image processing apparatus according to the fifth embodiment is provided with a means for selecting either preview or non-preview (FIG. 18), not shown, and a means for outputting a preview screen (FIG. 18), if preview is selected.

The user is allowed to make selection as to whether a preview screen is to be displayed. Only when it is likely that primary image information such as characters are cut off in the vicinity of the upper, lower, left and right margins, the user commands a preview screen to be displayed in order to confirm prior to borderless printing that the primary image information in the vicinity of the upper, lower, left and right margins is not cut off. This saves time spent for unnecessary preview.

In the aforementioned embodiments, while the borderless printing process under automatic decision has been described as being performed on the host computer side, the similar process may be performed on the print command received on the printer side so that the settings and operations are made from the operation panel of the printer. Alternatively, the only settings through a dialogue may be performed on the host computer side, and the processes of the actual borderless printing and conversion of print size may be performed on the printer side.

The aforementioned embodiments may be modified as follows: Some front portion of the print data cannot be printed in the borderless printing mode, and may overlap the background portion that can be printed in the borderless printing mode. The region of the image data of the front portion of the print data that cannot be printed in the borderless printing mode is first compared with the size of a medium to determine a reduction ratio such that the region of the image data of the front data can just fit to the size of the medium. Then, the image data of the front data that cannot be printed in the borderless printing mode is reduced by a ratio smaller than the above-described enlargement ratio. The thus reduced image data of the front portion and the expanded background portion may be overlaid one over the other.

In this manner, the front portion of the print data can fit to the printable size of the medium and the background data can be printed to fulfill the entire size of the medium.

Sixth Embodiment

Figure 17:
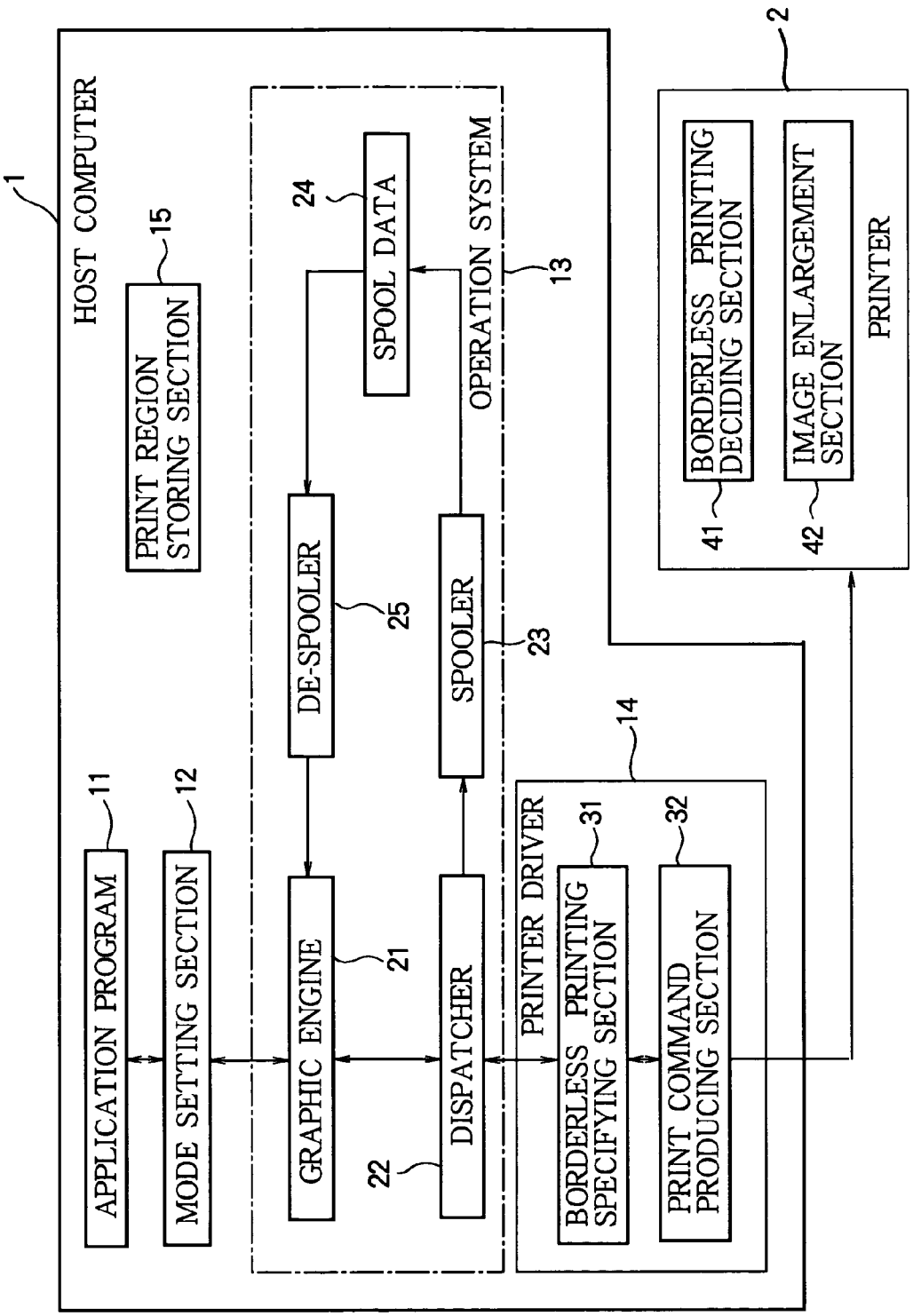
FIG. 17 is a functional block diagram illustrating the configuration of an image forming apparatus according to a sixth embodiment.

FIG. 17 is a functional block diagram illustrating the configuration of an image processing apparatus according to a sixth embodiment.

The sixth embodiment differs from the first embodiment in that a borderless printing deciding section 41 and an image enlargement section 42 are incorporated a print 2 and not in a host computer 1.

The operation of the host computer 1 is the same as the first embodiment except for the operations of the borderless printing deciding section 41 and the image enlargement section 42. Thus, the detailed description is omitted.

The operation of borderless printing deciding section 41 and an image enlargement section 42 in the printer 2 is the same as that of the first embodiment. Thus, the detailed description is omitted.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image processing apparatus comprising:
 a print region storing section that stores a print region of a medium;
 an image data producing section that produces image data that contains a first item of data and a second item of data, such that an image represented by the second item of data appears on an image represented by the first item of data when the image data is printed on the medium;
 an image region detecting section that detects an image region of the image data;
 a comparing section that compares the print region with the image region and outputs a comparison result indicative of a margin of the print region with respect to the image region;
 a deciding section that determines that the image data should be printed in a borderless printing mode if the comparison result is smaller than a reference value; and
 an image size expanding section that enlarges only the first item of data if the image data should be printed in the borderless printing mode, and
 an image data processing section that processes the image data such that the image data is ready to print, the image data being processed such that the image represented by the second item of data appears on the image represented by the first item of data when the image data is printed on the medium,
 wherein when the image region is placed over the print region of the medium, if the print region has a margin that does not overlap the image region and that is smaller than a predetermined area, said deciding section determines that the image data should be printed in the borderless printing mode.

2. The image processing apparatus according to claim 1, further comprising a print mode specifying section that produces a command to feed the medium at a timing such that an image region of the expanded image data in excess of the print region of the medium is not printed.

3. The image processing apparatus according to claim 2, wherein one complete image includes a plurality of items of image data and said deciding section determines whether each item of image data contains a corresponding image region that can be printed in the borderless printing mode.

4. The image processing apparatus according to claim 1, further comprising:
 a display section that displays the second image region; and
 a preview outputting section that causes said display section to display a preview of an image region of the expanded image data before the expanded image data is printed.

5. The image processing apparatus according to claim 1, further comprising a mode setting section that prompts a user to select a manual mode where the user determines that printing should be performed in the borderless printing mode or an automatic mode where said deciding section automatically determines based on the comparison result whether printing should be performed in the borderless printing mode.

6. The image processing apparatus according to claim 5, wherein said image size expanding section converts an item of image data having a first image region into expanded image data having a second image region, the item of image data being a one that can be printed in the borderless printing mode.

7. The image processing apparatus according to claim 6, further comprising:
   an operation/input section through which a user inputs a command; and
   a preview-display selecting section that allows the user to select through said operation/input section as to whether the preview should be displayed on said display section.

8. The image processing apparatus according to claim 1, wherein:
   the first item of data corresponds to a first image region,
   the image size expanding section converts the first item of data into enlarged image data having a second image region when the comparison result indicates that the image data should be printed in the borderless printing mode,
   the second image region is larger than the print region by a positional error of the second image region relative to the print region, and
   the image processing apparatus further comprises a print mode specifying section that produces a command to feed the medium such that the expanded image data is printed on the medium in position.

9. The image processing apparatus according to claim 1, wherein if the image data has an image region smaller than the print region of the medium, said deciding section determines that the image data has an image region that can be printed in the borderless printing mode.

10. An image processing apparatus comprising:
    a print region storing section that stores a print region of a medium;
    an image data producing section that produces image data;
    an image region detecting section that detects an image region of the image data;
    a comparing section that compares the print region with the image region and outputs a comparison result indicative of a margin of the print region with respect to the image region;
    a deciding section that determines based on the comparison result whether the image data should be printed in a borderless printing mode, the borderless printing mode being specified if the comparison result is smaller than a reference value;
    an enlarging section that enlarges the image data if the image data should be printed in the borderless printing mode, the image data being enlarged by a ratio such that a peripheral area of the image data that lies outside of the medium is within a predetermined range; and
    an image data processing section that processes the image data such that the image data is ready to print, the image data being processed when the comparison result indicates that the image data should be printed in the borderless printing mode,
    wherein when the image region is placed over the print region of the medium, if the print region has a margin that does not overlap the image region and that is smaller than a predetermined area, said deciding section determines that the image data should be printed in the borderless printing mode.

11. The image processing apparatus according to claim 10, further comprising a print mode specifying section that produces a command to feed the medium at a timing such that an image region of the expanded image data in excess of the print region of the medium is not printed.

12. The image processing apparatus according to claim 11, wherein one complete image includes a plurality of items of image data and said deciding section determines whether each item of image data contains a corresponding image region that can be printed in the borderless printing mode.

13. The image processing apparatus according to claim 10, further comprising;
    a display section that displays the second image region; and
    a preview outputting section that causes said display section to display a preview of an image region of the expanded image data before the expanded image data is printed.

14. The image processing apparatus according to claim 10, further comprising a mode setting section that prompts a user to select a manual mode where the user determines that printing should be performed in the borderless printing mode or an automatic mode where said deciding section automatically determines based on the comparison result whether printing should be performed in the borderless printing mode.

15. The image processing apparatus according to claim 14, wherein said image size expanding section converts an item of image data having a first image region into expanded image data having a second image region, the item of image data being a one that can be printed in the borderless printing mode.

16. The image processing apparatus according to claim 15, further comprising;
    an operation/input section through which a user inputs a command; and
    a preview-display selecting section that allows the user to select through said operation/input section as to whether the preview should be displayed on said display section.

17. The image processing apparatus according to claim 10, further comprising;
    an image size expanding section that converts the image data having a first image region into enlarged image data having a second image region if the comparison result is smaller than a reference value, wherein the second image region is larger than the print region by a positional error of the second image region relative to the print region; and
    a print mode specifying section that produces a command to feed the medium such that the expanded image data is printed on the medium in position.

18. The image processing apparatus according to claim 10, wherein if the image data has an image region smaller than the print region of the medium, said deciding section determines that the image data has an image region that can be printed in the borderless printing mode.

* * * * *